(12) United States Patent
Schroedter et al.

(10) Patent No.: US 11,782,263 B2
(45) Date of Patent: **\*Oct. 10, 2023**

(54) CAPACITIVE CHARGE BASED SELF-SENSING AND POSITION OBSERVER FOR ELECTROSTATIC MEMS MIRRORS

(71) Applicant: Infineon Technologies AG, Neubiberg (DE)

(72) Inventors: Richard Schroedter, Dresden (AT); Han Woong Yoo, Vienna (AT); David Brunner, Dobersberg (AT); Georg Schitter, Vienna (AT); Franz Michael Darrer, Graz (AT); Marcus Edward Hennecke, Graz (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/851,297

(22) Filed: Jun. 28, 2022

(65) Prior Publication Data

US 2022/0334377 A1 Oct. 20, 2022

Related U.S. Application Data

(63) Continuation of application No. 16/804,424, filed on Feb. 28, 2020, now Pat. No. 11,467,394.

(51) Int. Cl.
*G02B 26/08* (2006.01)
*G02B 26/10* (2006.01)
(Continued)

(52) U.S. Cl.
CPC ......... *G02B 26/0841* (2013.01); *G02B 7/185* (2013.01); *G02B 7/1821* (2013.01); *G02B 26/0858* (2013.01); *G02B 26/10* (2013.01)

(58) Field of Classification Search
CPC .. G02B 26/0841; G02B 7/1821; G02B 7/185; G02B 26/0858; G02B 26/10;
(Continued)

(56) References Cited

U.S. PATENT DOCUMENTS

| 6,538,802 B2 | 3/2003 | Wang et al. |
| 7,075,700 B2 | 7/2006 | Muenter |

(Continued)

FOREIGN PATENT DOCUMENTS

WO 2014117158 A1 7/2014

OTHER PUBLICATIONS

Brunner et al., "Data Based Modelling and Identification of Nonlinear SDOF MOEMS Mirror," SPIE Digital Library, Proceedings, vol. 10931, MOEMS and Miniaturized Systems XVIII; 2019, [Online] URL: https://doi.org/10.1117/12.2508429.

(Continued)

*Primary Examiner* — James C. Jones
(74) *Attorney, Agent, or Firm* — Harrity & Harrity, LLP

(57) ABSTRACT

An oscillator system includes an electrostatic oscillator structure configured to oscillate about an axis based on a deflection that varies over time; an actuator configured to drive the electrostatic oscillator structure about the axis, the actuator including a first capacitive element having a first capacitance dependent on the deflection and a second capacitive element having a second capacitance dependent on the deflection; a sensing circuit configured to receive a first displacement current from the first capacitive element and a second displacement current from the second capacitive element, to integrate the first displacement current to generate a first capacitive charge value, and to integrate the second displacement current to generate a second capacitive charge value; and a measurement circuit configured to receive the first and the second capacitive charge values and (Continued)

to measure the deflection of the electrostatic oscillator structure based on the first and the second capacitive charge values.

20 Claims, 11 Drawing Sheets

(51) Int. Cl.
  *G02B 7/185* (2021.01)
  *G02B 7/182* (2021.01)
(58) Field of Classification Search
  CPC .... G01S 7/4815; G01S 7/4816; G01S 7/4817; G01S 17/42; G01S 17/89
  See application file for complete search history.

(56) References Cited

U.S. PATENT DOCUMENTS

| | | | |
|---|---|---|---|
| 8,553,308 | B2 | 10/2013 | Goren et al. |
| 11,467,394 | B2 * | 10/2022 | Schroedter ........... G02B 7/1821 |
| 2003/0184844 | A1 | 10/2003 | Yazdi et al. |
| 2005/0286111 | A1 | 12/2005 | Muenter |
| 2008/0278784 | A1 | 11/2008 | Abe |
| 2015/0204650 | A1 | 7/2015 | Erlich |

OTHER PUBLICATIONS

Corro et al., "Single Ended Capacitive Self-Sensing System For Comb Drives Driven XY Nanopositioners," Science Direct, Sensors and Actuators A: Physical, 2017, [Online] URL: https://doi.org/10.1016/j.sna.2017.11.021.

Hung et al., "An Electrostatically Driven 2D Micro-Scanning Mirror With Capacitive Sensing For Projection Display," Science Direct, Sensors and Actuators A: Physical, 2014, [Online] URL: http://dx.doi.org/10.1016/j.sna.2014.10.008.

Moore et al., "Vibration Control With MEMS Electrostatic Drives: A Self-Sensing Approach," IEEE Transactions On Control Systems Technology, vol. 23(3), 2015, [Online] URL: https://ieeexplore.ieee.org/document/6937166.

Roscher., et al., "Driver ASIC for Synchronized Excitation of Resonant Micromirrors," SPIE Digital Library, Proceeding of SPIE, vol. 4985, 2019, [Online] URL:https://www.spiedigitallibrary.org/search?term=driver+asic.

* cited by examiner

CAPACITIVE CHARGE BASED SELF-SENSING AND POSITION OBSERVER FOR ELECTROSTATIC MEMS MIRRORS

CROSS-REFERENCE TO RELATED APPLICATIONS

This application is a continuation of U.S. patent application Ser. No. 16/804,424 filed on Feb. 28, 2020, which is incorporated by reference as if fully set forth.

FIELD

The present disclosure relates generally to a microelectromechanical system (MEMS) oscillating system and method for operating the same, and, more particularly, to sensing a position of an oscillating structure in a MEMS oscillating system and controlling same based on the sensed position.

BACKGROUND

Light Detection and Ranging (LIDAR), is a remote sensing method that uses light in the form of a pulsed laser to measure ranges (variable distances) to one or more objects in a field of view. In particular, a microelectromechanical system (MEMS) mirror is used to scan light across the field of view. Arrays of photodetectors receive reflections from objects illuminated by the light, and the time it takes for the reflections to arrive at various sensors in the photodetector array is determined. This is also referred to as measuring time-of-flight (TOF). LIDAR systems form depth measurements and make distance measurements by mapping the distance to objects based on the time-of-flight computations. Thus, the time-of-flight computations can create distance and depth maps, which may be used to generate images.

A LIDAR scanning system may include one or more scanning mirrors and corresponding circuitry for scanning different field of views in the horizontal and/or vertical direction. MEMS mirrors operated at a certain resonance frequency may be impacted by various systematic and non-systematic error sources. For example, a scanning mirror may be a non-linear oscillator with a dependency between angle amplitude and frequency. If an oscillator with a non-linear frequency response is influenced by external, perhaps unobservable, disturbances, the oscillator may change its oscillation amplitude and in turn its frequency due to its non-linear dependency.

These errors may result in a considerable laser shooting/pointing error. For example, these issues may lead to a mismatch between expected mirror position and measured position. Since the precise measurement and estimation of the mirror's position is important for a MEMS-based LIDAR system, it may be important to be able to detect and compensate systematic and non-systematic error sources. For example, depending on the application, LIDAR devices may have to operate in harsh environments in which disturbances such as temperature, pressure, and external vibration must be considered. To ensure high position accuracy and respective image resolution while shooting a laser pulse, a precise position estimation of the mirror is required.

Therefore, an improved control structure for oscillators with a non-linear frequency response may be desirable.

SUMMARY

One or more embodiments provide an oscillator system that includes an electrostatic oscillator structure configured to oscillate about an axis based on a deflection of the electrostatic oscillator structure that varies over time; an actuator configured to drive the electrostatic oscillator structure about the axis based on a driving signal, the actuator including a first capacitive element have a first capacitance dependent on the deflection and a second capacitive element having a second capacitance dependent on the deflection; a driver configured to generate the driving signal; a sensing circuit configured to receive a first displacement current from the first capacitive element and a second displacement current from the second capacitive element, integrate the first displacement current to generate a first capacitive charge value, and integrate the second displacement current to generate a second capacitive charge value; and a measurement circuit configured to receive the first capacitive charge value and the second capacitive charge value and measure the deflection of the electrostatic oscillator structure based on the first capacitive charge value and the second capacitive charge value.

One or more embodiments provide an oscillator system that includes an electrostatic oscillator structure configured to oscillate about an axis based on a deflection of the electrostatic oscillator structure that varies over time; an actuator configured to drive the electrostatic oscillator structure about the axis based on a driving signal, the actuator including a first capacitive element have a first capacitance dependent on the deflection and a second capacitive element having a second capacitance dependent on the deflection; a driver configured to generate the driving signal; a sensing circuit including a first capacitor coupled to the first capacitive element and a second capacitor coupled to the second capacitive element, wherein the first capacitor is configured to generate a first capacitive charge value by collecting a first displacement current from the first capacitive element and the second capacitor is configured to generate a second capacitive charge value by collecting a second displacement current from the second capacitive element; and a measurement circuit configured to receive the first capacitive charge value and the second capacitive charge value and measure a sign of the deflection based on the first capacitive charge value and the second capacitive charge value, wherein the sign of the deflection is indicative of a deflection direction of the electrostatic oscillator structure about the axis.

One or more embodiments provide an oscillator system that includes an electrostatic oscillator structure configured to oscillate about an axis based on a deflection that varies over time; an actuator configured to drive the electrostatic oscillator structure about the axis based on a time-varying driving signal, the actuator including a first capacitive element have a first capacitance dependent on the deflection and a second capacitive element having a second capacitance dependent on the deflection; a driver configured to generate the time-varying driving signal including an on-time component that alternates with an off-time component; a sensing circuit configured to receive a first displacement current from the first capacitive element, receive a second displacement current from the second capacitive element, continuously measure the first displacement current during the on-time of the time-varying driving signal, and continuously measure the second displacement current during the on-time of the time-varying driving signal; and a measurement circuit configured to generate a first displacement current curve from the measured first displacement current, generate a second displacement current curve from the measured second displacement current, match the first displacement current curve to stored calibration data, match the second displacement current curve to the stored calibration data, and determine an on-time deflection corresponding to a movement of the oscillating structure during the on-time component of the driving signal based on the stored calibration data matched with the first displacement current curve and the stored calibration data matched with the second displacement current curve.

BRIEF DESCRIPTION OF THE DRAWINGS

Embodiments are described herein making reference to the appended drawings.

DETAILED DESCRIPTION

Figure 1A:
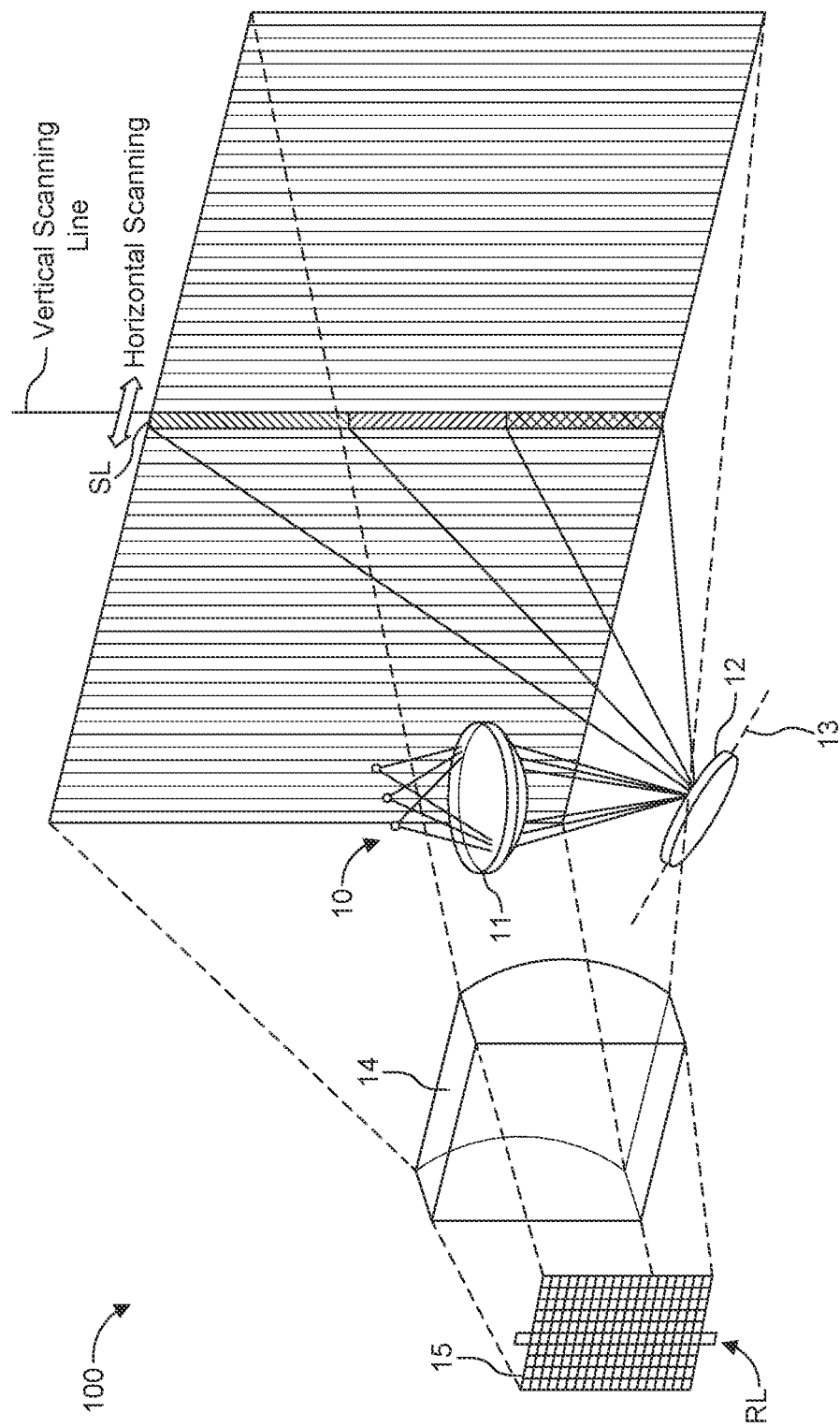
FIG. 1A is a schematic diagram of a LIDAR scanning system in accordance with one or more embodiments.

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. Additionally, further features or elements in addition to the ones explicitly shown and described may be provided, for example conventional components of sensor devices.

Features from different embodiments may be combined to form further embodiments, unless specifically noted otherwise. Variations or modifications described with respect to one of the embodiments may also be applicable to other embodiments. In some instances, well-known structures and devices are shown in block diagram form rather than in detail in order to avoid obscuring the embodiments.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

Embodiments relate to optical sensors and optical sensor systems and to obtaining information about optical sensors and optical sensor systems. A sensor may refer to a component which converts a physical quantity to be measured to an electric signal, for example a current signal or a voltage signal. The physical quantity may, for example, comprise electromagnetic radiation, such as visible light, infrared (IR) radiation, or other type of illumination signal, a current, or a voltage, but is not limited thereto. For example, an image sensor may be a silicon chip inside a camera that converts photons of light coming from a lens into voltages. The larger the active area of the sensor, the more light that can be collected to create an image.

A sensor device as used herein may refer to a device which comprises a sensor and further components, for example biasing circuitry, an analog-to-digital converter or a filter. A sensor device may be integrated on a single chip, although in other embodiments a plurality of chips or also components external to a chip may be used for implementing a sensor device.

In Light Detection and Ranging (LIDAR) systems, a light source transmits light pulses into a field of view and the light reflects from one or more objects by backscattering. In particular, LIDAR is a direct Time-of-Flight (TOF) system in which the light pulses (e.g., laser beams of infrared light) are emitted into the field of view, and a pixel array detects and measures the reflected beams. For example, an array of photodetectors receives reflections from objects illuminated by the light.

Differences in return times for each light pulse across multiple pixels of the pixel array can then be used to make digital 3D representations of an environment or to generate other sensor data. For example, the light source may emit a single light pulse, and a time-to-digital converter (TDC) electrically coupled to the pixel array may count from the time the light pulse is emitted, corresponding to a start signal, until a time the reflected light pulse is received at the receiver (i.e., at the pixel array), corresponding to a stop signal. The "time-of-flight" of the light pulse is then translated into a distance.

In another example, an analog-to-digital converter (ADC) may be electrically coupled to the pixel array (e.g., indirectly coupled with intervening elements in-between) for pulse detection and ToF measurement. For example, an ADC may be used to estimate a time interval between start/stop signals with an appropriate algorithm. For example, an ADC may be used detect an analog electrical signal from one or more photodiodes to estimate a time interval between a start signal (i.e., corresponding to a timing of a transmitted light pulse)

and a stop signal (i.e., corresponding to a timing of receiving an analog electrical signal at an ADC) with an appropriate algorithm.

A scan such as an oscillating horizontal scan (e.g., from left to right and right to left of a field of view) or an oscillating vertical scan (e.g., from bottom to top and top to bottom of a field of view) can illuminate a scene in a continuous scan fashion. Each firing of the laser beam by the light sources can result in a scan line in the "field of view." By emitting successive light pulses in different scanning directions, an area referred to as the field of view can be scanned and objects within the area can be detected and imaged. Thus, the field of view represents a scanning plane having a center of projection. A raster scan could also be used.

FIG. 1A is a schematic diagram of a LIDAR scanning system 100 in accordance with one or more embodiments. The LIDAR scanning system 100 is an optical scanning device that includes a transmitter, including an illumination unit 10, a transmitter optics 11, and a one-dimensional (1D) microelectromechanical system (MEMS) mirror 12, and a receiver, including a second optical component 14 and a photodetector detector array 15.

The illumination unit 10 includes multiple light sources (e.g., laser diodes or light emitting diodes) that are linearly aligned in single bar formation and are configured to transmit light used for scanning an object. The light emitted by the light sources is typically infrared light although light with another wavelength might also be used. As can be seen in the embodiment of FIG. 1A, the shape of the light emitted by the light sources is spread in a direction perpendicular to the transmission direction to form a light beam with an oblong shape perpendicular to a transmission. The illumination light transmitted from the light sources are directed towards the transmitter optics 11 configured to focus each laser onto a one-dimensional MEMS mirror 12. The transmitter optics 11 may be, for example, a lens or a prism.

When reflected by the MEMS mirror 12, the light from the light sources are aligned vertically to form for each emitted laser shot a one-dimensional vertical scanning line SL of infrared light or a vertical bar of infrared light. Each light source of the illumination unit 10 contributes to a different vertical region of the vertical scanning line SL. Thus, the light sources may be concurrently activated and concurrently deactivated to obtain a light pulse with multiple segments, where each segment corresponds to a respective light source, However, each vertical region or segment of the vertical scanning line SL may also be independently active or inactive by turning on or off a corresponding one of the light sources of the illumination unit 10. Thus, a partial or full vertical scanning line SL of light may be output from the system 100 into the field of view.

Accordingly, the transmitter of the system 100 is an optical arrangement configured to generate laser beams based on the laser pulses, the laser beams having an oblong shape extending in a direction perpendicular to a transmission direction of the laser beams.

In addition, while three laser sources are shown, it will be appreciated that the number of laser sources are not limited thereto. For example, the vertical scanning line SL may be generated by a single laser source, two laser sources or more than three laser sources.

The MEMS mirror 12 is a mechanical moving mirror (i.e., a MEMS micro-mirror) integrated on a semiconductor chip (not shown). The MEMS mirror 12 according to this embodiment is suspended by mechanical springs (e.g., leaf springs, sometimes referred to as cantilever beams) or flexures and is configured to rotate about a single axis and can be said to have only one degree of freedom for movement. Due to this single axis of rotation, the MEMS mirror 12 is referred to as a 1D MEMS mirror.

In order to make a MEMS scanning mirror robust against vibrations, the mirror should have a low inertia, i.e., a light and stiff mirror body. In addition, the mirror should have a high stiffness of its suspension for all degrees-of-freedom (DOF) of the mirror body.

In order to achieve a light and stiff mirror body, the mirror body may comprise a relatively thin mirror and a thicker reinforcement structure for the mirror. The mirror body may be rotatably arranged in a mirror frame around a rotation axis extending in a plane defined by the mirror frame. The rotation axis may extend to first and second mutually opposite end-portions of the mirror body. The mirror may have a reflective plane on a first main surface and opposite the first main surface a second main surface provided with the reinforcement structure.

Figure 1B:
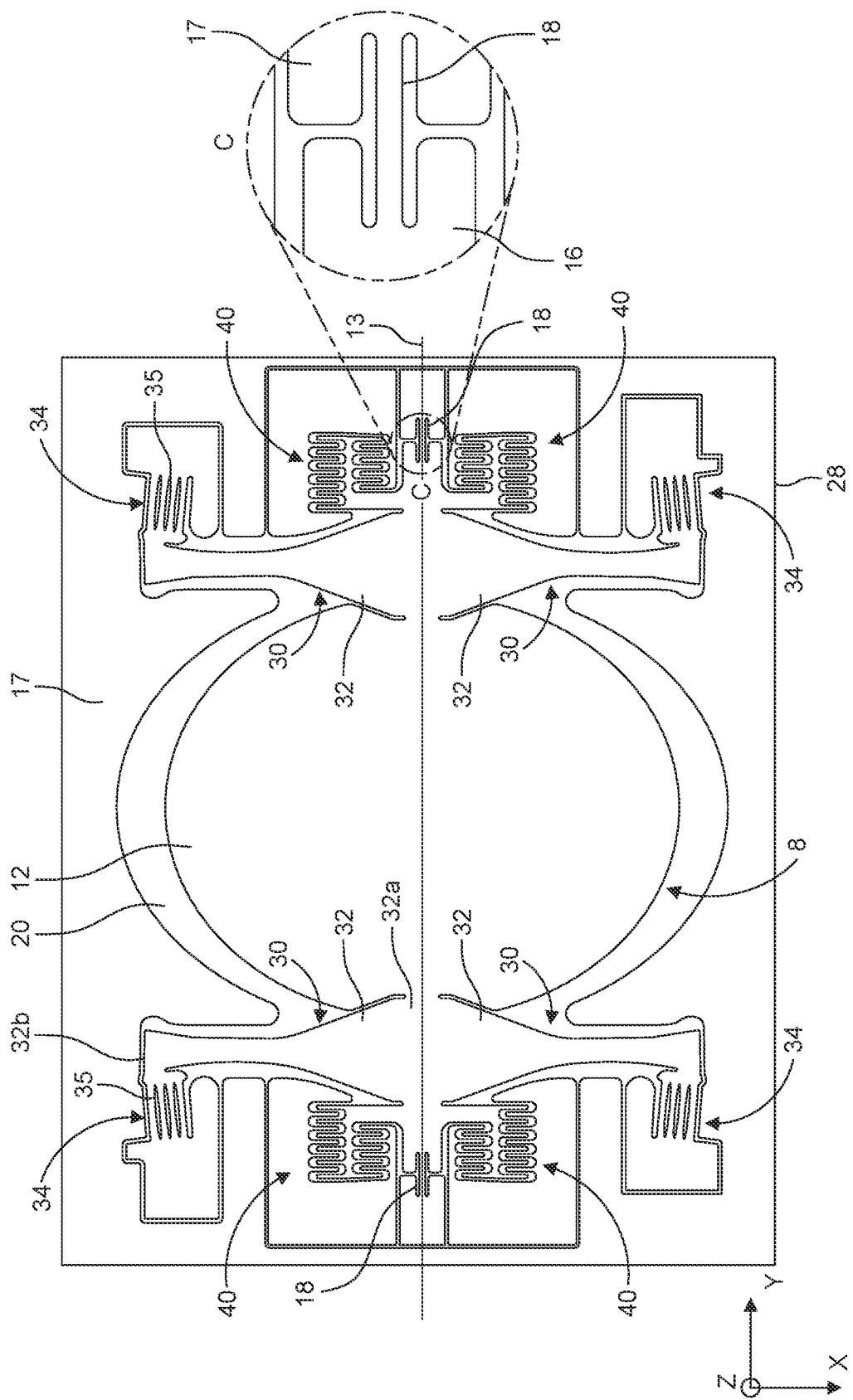
FIG. 1B shows a schematic top view of an example of a mirror device in accordance with one or more embodiments.

In order to achieve a high stiffness suspension, the mirror body may be supported in the mirror frame using support beams extending along the rotation axis and additional cantilever beam or leaf spring assemblies, as illustrated in FIG. 1B. Generally, as defined herein, leaf spring assemblies may be referred to a cantilever beam assemblies, and vice versa. Similarly, leaf springs and cantilever beams may be used interchangeably.

A cantilever beam assembly may have a longitudinal direction and may extend within the plane defined by the frame. The support beams may be connected between the mirror body and the frame at two opposite ends of the mirror body along the rotation axis. The cantilever beam assembly may have a cantilever beam coupled at a first end via a relief structure to the mirror frame and fixed at a second end to the mirror body. The cantilever beam may have a thickness, perpendicular to a plane of the frame, that is smaller than its width in the plane of the frame.

Results of the low inertia and the high suspension stiffness of the mirror body may be high resonance frequencies a good dynamic performance. These properties may also make the device which is operated at the resonance frequency around the main axis of rotation very fast. In normal operation, i.e., at resonance, accelerations at the mirror tips of typically 10000 G may be achieved. This may make any external vibration negligible.

The MEMS mirror 12 exhibits a non-linear behavior due the stiffness of the suspension structure (i.e., the cantilever beams) such that an oscillation frequency of the mirror increases with an increase in oscillation amplitude (i.e., deflection angle amplitude θ) in a non-linear manner. Thus, the stiffening of the suspension causes the MEMS mirror 12 to be more strongly non-linear.

Figure 2:
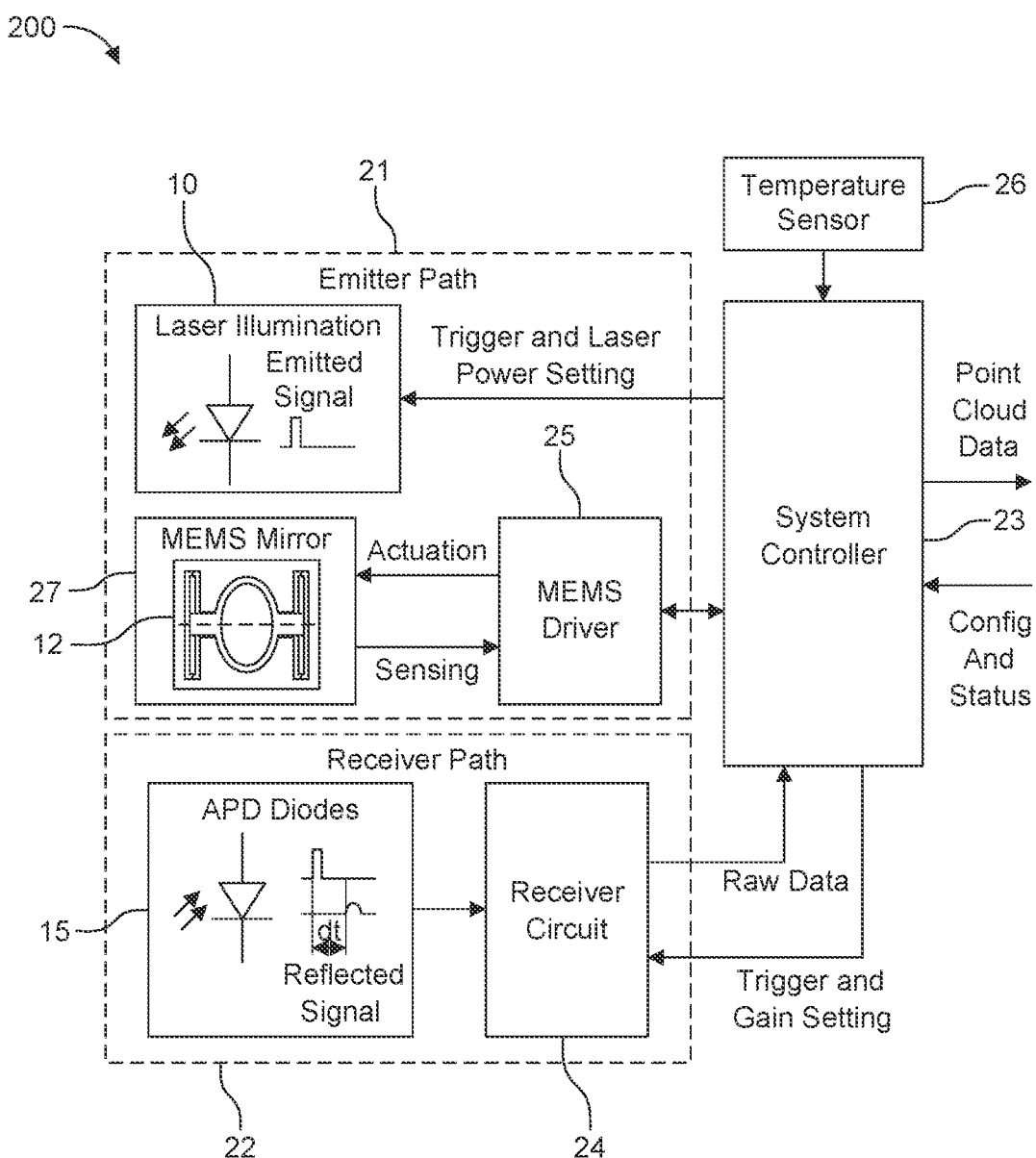
FIG. 2 is a schematic block diagram of the LIDAR scanning system in accordance with one or more embodiments.

The MEMS mirror 12 may be assembled in a chip package 27 shown in FIG. 2 to protect the mirror. For example, the MEMS mirror 12 may be hermetically sealed at a low pressure (i.e., at a pressure lower than atmospheric pressure) in a chip package. This low pressure may provide a low damping environment in which the MEMS mirror 12 operates.

Conceivable packages may include or differ by one or more of the following variants: different substrates (e.g., metal (leadframe), ceramic, organic (similar to printed circuit board (PCB) material)), and different optical lids or covers (e.g., optical material of glass, silicon, sapphire, etc.). Furthermore, the optical lids or covers may be cavityforming caps, may be integrated into a frame (e.g., a metal frame), or assembled onto a pre-mold cavity or a ceramic cavity.

One or more methods (e.g., adhesive bonding, gluing, soldering, welding, and the like) or one or more different materials (e.g., silicone, glass solder, AuSn, and the like) may be used to bond one or more elements together (e.g., joining cap or lid to substrate). It will be appreciated that bonding methods may be interchangeable across various embodiments disclosed herein.

Alternatively, a wafer-level approach may be used such that a cavity-shaped lid may be directly mounted onto the MEMS chip (or even on wafer-level prior to singulation). Here, if the lid attachment leaves the electrical pads exposed, the sub-mount chip/lid can further be processed into a package using molding or casting processes.

The MEMS mirror 12 is a mechanical moving mirror (i.e., a MEMS micro-mirror) integrated on a semiconductor chip (not shown). The MEMS mirror 12 according to this embodiment is configured to rotate about a single scanning axis and can be said to have only one degree of freedom for scanning. Distinguished from 2D-MEMS mirrors (2D MEMS scanners), in the 1D MEMS mirror, the single scanning axis is fixed to a non-rotating substrate and therefore maintains its spatial orientation during the oscillation of the MEMS mirror. Thus, a 1D oscillating MEMS mirror is by design more robust against vibrations and shocks than 2D MEMS mirror solutions. Due to this single scanning axis of rotation, the MEMS mirror 12 is referred to as a 1D MEMS mirror or 1D MEMS scanner. While embodiments describe using 1D oscillating MEMS mirrors, the synchronization methods described herein can be extended to 2D MEMS mirrors as well. In this case, both axes of a single 2D MEMS mirror are controlled by a different phase-locked loops (PLLs) such that a first scanning direction of the 2D MEMS mirrors according to a first axis are synchronized according to any of the synchronization techniques described herein, and a second scanning direction of the 2D MEMS mirrors according to a second axis are synchronized according to any of the synchronization techniques described herein. It is further possible that the different PLLs are provided in separate MEMS drivers or integrated into a single MEMS driver for each 2D MEMS mirror.

The MEMS mirror 12 itself is a non-linear resonator (i.e., a resonant MEMS mirror) configured to oscillate "side-to-side" about a single scanning axis 13 at a resonance frequency such that the light reflected from the MEMS mirror 12 (i.e., the vertical scanning line of light) oscillates back and forth in a horizontal scanning direction. The MEMS mirror 12 is more strongly non-linear due to the stiffening of the suspension. A scanning period or an oscillation period is defined, for example, by one complete oscillation from a first edge of the field of view (e.g., left side) to a second edge of the field of view (e.g., right side) and then back again to the first edge. A mirror period of the MEMS mirror 12 corresponds to a scanning period.

Thus, the field of view is scanned in the horizontal direction by the vertical bar of light by changing the angle θ of the MEMS mirror 12 on its scanning axis 13. For example, the MEMS mirror 12 may be configured to oscillate at a resonance frequency of 2 kHz, between +/−15 degrees to steer the light over+/−30 degrees making up the scanning range of the field of view. Thus, the field of view may be scanned, line-by-line, by a rotation of the MEMS mirror 12 through its degree of motion. One such sequence through the degree of motion (e.g., from −15 degrees to +15 degrees) is referred to as a single scan or scanning cycle. Multiple scans may be used to generate distance and depth maps, as well as 3D images by a processing unit.

While the transmission mirror is described in the context of a MEMS mirror, it will be appreciated that other 1D mirrors can also be used. In addition, the resonance frequency or the degree of rotation is not limited to 2 kHz and +/−15 degrees, respectively, and both the resonance frequency and the field of view may be increased or decreased according to the application. Thus, a one-dimensional scanning mirror is configured to oscillate about a single scanning axis and direct the laser beams at different directions into a field of view. Hence, a transmission technique includes transmitting the beams of light into the field of view from a transmission mirror that oscillates about a single scanning axis such that the beams of light are projected as a vertical scanning line SL into the field of view that moves horizontally across the field of view as the transmission mirror oscillates about the single scanning axis.

Upon impinging one or more objects, the transmitted bar of vertical light is reflected by backscattering back towards the LIDAR scanning system 100 as a reflected vertical line where the second optical component 14 (e.g., a lens or prism) receives the reflected light. The second optical component 14 directs the reflected light onto the photodetector array 15 that receives the reflected light as a receiving line RL and is configured to generate electrical measurement signals. The electrical measurement signals may be used for generating a 3D map of the environment and/or other object data based on the reflected light (e.g., via TOF calculations and processing).

The receiving line is shown as a vertical column of light that extends along one of the pixel columns in a lengthwise direction of the pixel column. The receiving line has three regions that correspond to the vertical scanning line SL shown in FIG. 1A. As the vertical scanning line SL moves horizontally across the field of view, the vertical column of light RL incident on the 2D photodetector array 15 also moves horizontally across the 2D photodetector array 15. The reflected light beam RL moves from a first edge of the photodetector detector array 15 to a second edge of the photodetector detector array 15 as the receiving direction of the reflected light beam RL changes. The receiving direction of the reflected light beam RL corresponds to a transmission direction of the scanning line SL.

The photodetector array 15 can be any of a number of photodetector types; including avalanche photodiodes (APD), photocells, and/or other photodiode devices. Imaging sensors such as charge-coupled devices (CCDs) can be the photodetectors. In the examples provided herein, the photodetector array 15 is a two-dimensional (2D) APD array that comprises an array of APD pixels. In other embodiments, the photodetector array 15 may be a 1D array that includes a single column of photodiodes. The activation of the photodiodes may be synchronized with light pulses emitted by the illumination unit 10. Alternatively, a single photo detector call/pixel, as opposed to an array, may be used. For example, a single photo detector call/pixel may be used in case of a 2×1D scanning transmitter in a coaxial LIDAR architecture.

The photodetector array 15 receives reflective light pulses as the receiving line RL and generates electrical signals in response thereto. Since the time of transmission of each light pulse from the illumination unit 10 is known, and because the light travels at a known speed, a time-of-flight computation using the electrical signals can determine the distance of objects from the photodetector array 15. A depth map can plot the distance information.

In one example, for each distance sampling, a microcontroller triggers a laser pulse from each of the light sources of the illumination unit 10 and also starts a timer in a Time-to-Digital Converter (TDC) Integrated Circuit (IC). The laser pulse is propagated through the transmission optics, reflected by the target field, and captured by an APD of the APD array 15. The APD emits a short electrical pulse which is then amplified by an electrical signal amplifier. A comparator IC recognizes the pulse and sends a digital signal to the TDC to stop the timer. The TDC uses a clock frequency to calibrate each measurement. The TDC sends the serial data of the differential time between the start and stop digital signals to the microcontroller, which filters out any error reads, averages multiple time measurements, and calculates the distance to the target at that particular field position. By emitting successive light pulses in different directions established by the MEMS mirror, an area (i.e., a field of view) can be scanned, a three-dimensional image can be generated, and objects within the area can be detected.

Alternatively, instead of using the TDC approach, ADCs may be used for signal detection and ToF measurement. For example, each ADC may be used detect an analog electrical signal from one or more photodiodes to estimate a time interval between a start signal (i.e., corresponding to a timing of a transmitted light pulse) and a stop signal (i.e., corresponding to a timing of receiving an analog electrical signal at an ADC) with an appropriate algorithm.

It will be appreciated that the above-described horizontal scanning system 100 may also be used for vertical scanning. In this case, the scanning arrangement is arranged such that the scanning direction is rotated 90° such that the scanning line SL and the receiving line RL move in the vertical direction (i.e., from top to bottom or from bottom to top). As such, the scanning line is a horizontal scanning line SL that is projected into the field of view that moves vertically across the field of view as the transmission mirror oscillates about the single scanning axis. Furthermore, as the horizontal scanning line SL moves vertically across the field of view, the horizontal column of light RL incident on the 2D photodetector array 15 also moves vertically across the 2D photodetector array 15.

It will be further appreciated that a LIDAR scanning system may include multiple scanning mirrors 12 and corresponding circuitry for scanning different field of views in the horizontal and/or vertical direction. For example, a vehicle may include multiple scanning mirrors arranged at different locations on the vehicle to scan different field of views. Alternatively, the synchronized MEMS mirrors can be used in a 2×1D system, such as a Lissajous scanning system. In this case, the MEMS mirrors are mounted in the same location in the vehicle and are configured to scan a same field of view.

FIG. 1B shows a schematic top view of an example of a mirror device in accordance with one or more embodiments. Referring to FIG. 1B, an example of a mirror device, such as a MEMS scanning micro mirror, is now explained. The mirror device comprises a mirror body 8. The mirror body 8 comprises a mirror 12 and a mirror support 16. The mirror device further includes a frame 17. The mirror body 8 is arranged in the frame 17. The frame 17 defines a plane, i.e., the (x, y) plane in FIG. 1B. The plane defined by the frame 17 may be parallel to planes defined by main surfaces of a layer or a plurality of layers in which the frame 17 is formed.

The mirror body 8 is rotatable around a rotation axis 13 extending in the plane de-fined by the frame 17. Support beams 18, which may also be referred to as torsion beams, are connected between the mirror body 8 and the frame 17 along the rotation axis 13. To be more specific, a first support beam 18 is connected between a first end of the mirror body 8 and the frame 17 and a second support beam 18 is connected between a second end of the mirror body 8 and the frame 17, where the second end of the mirror body 8 is opposite to the first end in the direction of the rotation axis 13. An enlarged view of one of the support beams 18 is shown in the enlarged portion C in the right hand side of FIG. 1B. As can be seen, support beams 18 connect parts of mirror support 16 to parts of frame 17 and permit the mirror body 8 to be rotated around rotation axis 13. The support beams 18 may be collinear with the rotation axis 13.

Those skilled in the art will appreciate that the shape of the mirror 12 can be any shape desired for a particular application, e.g., a circle, ellipse, square, rectangle or other shape as desired.

The mirror frame 17 defines a mirror recess 20 in which the mirror body 8 is arranged. The mirror recess 20 is defined by a recess periphery 28 of the mirror frame 17. The mirror frame 17 may also be structured to define further recesses in which other components may be arranged, such as actuators and leaf spring assemblies.

The mirror device includes at least one leaf spring assembly 30. In the example shown, the mirror device includes two pairs of leaf spring assemblies 30, where the leaf spring assembly in each pair extends from the mirror body 8 in opposite directions. In the example shown, the leaf spring assemblies 30 are arranged symmetrically with respect to the axis of rotation 13.

The at least one leaf spring assembly 30 includes a leaf spring 32 and a relief link 34. The relief link 34 may have one or more relief springs 35. The leaf spring 32 includes a first end 32a and a second end 32b. The first end 32a is coupled to the mirror body 8 and the second end is coupled to the frame 17. Each leaf spring 32 has a longitudinal direction or extension between the first end 32a and the second end 32b. The first end 32a is fixed to the mirror support (not illustrated) and the second end 32b is coupled to frame 17 via the relief link 34. In the examples, the first ends 32a of two leaf springs 32 extending from the same portion of the mirror body 8 in different directions may be connected to each other (e.g., the leaf springs of the left side of the mirror 12 or the leaf springs on the right side of the mirror 12).

In some examples, the shape of the mirror 12 may include concave portions in the region of the axis of rotation 13, wherein portions of the leaf springs 32 extend into the concave portions of the mirror 12. In some examples, leaf springs 32 and mirror 12 may be formed in a same layer of material and may be connected to each other adjacent the axis of rotation 13.

In some examples, the leaf springs 32 may be implemented in a single crystal silicon layer having a direction of lower material stiffness, where the leaf springs have their longitudinal direction aligned with the direction of lower material stiffness. In some examples, the leaf springs 32 may be implemented in a silicon layer having a <100> axis and the leaf springs have their longitudinal direction aligned with the <100> direction which in this case has the lower material stiffness.

Torsional stiffness about the rotation axis 13 may be set using the leaf spring assemblies 30. The pair of support beams 18 supports the mirror body 8 vertically, i.e., perpendicular to a main surface of the frame 17, at the rotation axis 13. However, the support beams 18 may have a negligible effect on the torsional stiffness, so that the natural frequency of the mirror body may be substantially determined by the leaf spring assemblies 30. The natural frequency may be substantially independent of the support beams 18. The natural frequency as defined herein is the undamped frequency of the mirror body 8 (i.e., the mirror 12) about its rotation axis 13. The support beams 18 may define the out-of-plane rocking and vertical mode stiffness for the corresponding dynamic modes and corresponding resonance frequencies. The torsional stiffness can be decoupled from the out-of-plane rocking and vertical mode stiffness so that the out-of-plane rocking and vertical mode frequencies can be set to desired values, such as higher values, without influencing the torsional mode stiffness and resonance frequency. As defined herein, the Y axis is along the rotation axis 13, the X axis is perpendicular to the Y axis on the mirror plane when the mirror 12 is at rest, and the Z axis is perpendicular to and out of the mirror plane when the mirror 12 is at rest. The X, Y, and Z axis are axes of a tree dimensional Cartesian coordinate system.

In the example shown in FIG. 1B, one end of the at least one leaf spring 32 is connected to the mirror body 8 at a location close to the rotation axis 13. The other end 32b is connected to the associated relief link 34 at a location further away from the rotation axis 13. The leaf spring assemblies 30 may provide torsional stiffness to the mirror body 8 about the rotation axis 13. The relief links 34 may provide a compliant or flexible coupling from the leaf springs 32 to the frame 17. The relief links 34 may have a relatively low stiffness longitudinal to the leaf springs 32, i.e., in X direction in FIG. 1B, which allows one end of the leaf springs 32 to move in their longitudinal direction when the mirror body 8 rotates around the rotation axis 13. The relief links 34 may have a relatively high stiffness in the transverse direction, i.e., in Z direction and in Y direction in FIG. 1B.

The resonance frequency for rotation of the mirror 12 around the rotation axis 13 may be defined mainly by the inertia of the mirror body 8 and the stiffness of the leaf spring assemblies 30, which may be defined by the bending stiffness of the leaf springs 32 and by the torsional and translational stiffness of the relief links 34. The bending stiffness of the leaf springs 32 may be defined by the length, width, and, in particular, the thickness of the leaf springs 32. The combined stiffness in X direction of the support beams 18 and the relief links 34 may prevent movement of the mirror body 8 perpendicular to the rotation axis 13 (in the X direction) during operation. More detail on the relief links is provided be-low.

The support beams 18 are connected between the frame 17 and the mirror body 8 along the rotation axis 13 to support the mirror body 8 in the frame 17. In one example, the support beams 18 have narrow rectangular cross-sections perpendicular to the rotation axis 13, with the long axis of the rectangle perpendicular to the face of the mirror 12 and the mirror body 8, and the short axis of the rectangle parallel to the face of the mirror 12. The torsional stiffness corresponding to a rotation of the mirror body 8 around rotation axis 13 may be provided by the leaf spring assemblies 30. The support beams 18 may serve only for support of the mirror body 8 and may have a negligible effect on the torsional stiffness. The support beams 18 may be sized so that the stiffness against vertical displacement (in Z direction) of the mirror body 8 and against its out-of-plane translation perpendicular to the rotation axis 13 (the X axis) may be as high as possible.

The mirror device may also include at least one actuator 40 to provide torque to drive the mirror body 8 about the rotation axis 13. In one example, the actuator may by a comb drive that includes mirror combs attached to the mirror body 8 interleaved with frame combs attached to the frame 17. Applying a difference in electrical potential between interleaved mirror combs and frame combs creates a driving force between the mirror combs and the frame combs, which creates a torque on the mirror body 8 about the rotation axis 13. An oscillating electrical potential can be applied to drive the mirror device at its natural frequency.

In other examples, actuation methods may include electromagnetic actuation and piezoelectric actuators. In electromagnetic actuation, the micro mirror may be "immersed" in a magnetic field and an alternating electric current through conductive paths may create the oscillating torque around the rotation axis 13. Piezoelectric actuators may be integrated in the leaf springs or the leaf springs may be made of piezoelectric material to produce alternating beam bending forces in response to an electrical signal and generate the oscillation torque.

The MEMS mirror 12 exhibits a non-linear behavior due the torsional stiffness about the rotation axis 13 caused by the leaf spring assemblies 30 such that an oscillation frequency of the mirror 12 increases with an increase in oscillation amplitude θ (i.e., deflection angle amplitude) in a non-linear manner. Thus, the stiffening of the leaf springs 32 as the mirror rotates causes the MEMS mirror 12 to be more strongly non-linear.

FIG. 2 is a schematic block diagram of the LIDAR scanning system 200 in accordance with one or more embodiments. In particular, FIG. 2 shows additional features of the LIDAR scanning system 200, including example processing and control system components such as a MEMS driver, a receiver circuit, and a system controller.

The LIDAR scanning system 200 includes a transmitter unit 21 that is responsible for an emitter path of the system 200, and a receiver unit 22 that is responsible for a receiver path of the system 200. The system also includes a system controller 23 that is configured to control components of the transmitter unit 21 and the receiver unit 22, and to receive raw data from the receiver unit 22 and perform processing thereon (e.g., via digital signal processing) for generating object data (e.g., point cloud data). Thus, the system controller 23 includes at least one processor and/or processor circuitry for processing data, as well as control circuitry, such as a microcontroller, that is configured to generate control signals. The LIDAR scanning system 200 may also include a temperature sensor 26.

The receiver unit 22 includes the photodetector array 15 as well as a receiver circuit 24. The receiver circuit 24 may include one or more circuitries or sub-circuitries for receiving and/or processing information. The receiver circuit 24 may receive the analog electrical signals from the APD diodes of the photodetector array 15 and transmit the electrical signals as raw analog data or raw digital data to the system controller 23. In order to transmit the raw data as digital data, the receiver circuit 24 may include an ADC and a field programmable gate array (FPGA). The receiver circuit 24 may also receive trigger control signals from the system controller 23 that triggers an activation of one or more APD diodes. The receiver circuit 24 may also receive gain setting control signals for controlling the gain of one or more APD diodes.

The transmitter unit 21 includes the illumination unit 10, the MEMS mirror 12, and a MEMS driver 25 configured to drive the MEMS mirror 12. In particular, the MEMS driver 25 actuates and senses the rotation position of the mirror, and provides position information (e.g., tilt angle or degree of rotation about the rotation axis) of the mirror to the system controller 23. Based on this position information, the laser sources of the illumination unit 10 are triggered by the system controller 23 and the photodiodes (e.g., APD diodes) are activated to sense, and thus measure, a reflected light signal. Thus, a higher accuracy in position sensing of the MEMS mirror results in a more accurate and precise control of other components of the LIDAR system.

The MEMS driver 25 may also measure and record mirror frequency and currents using a change in capacitance in a comb-drive rotor and stator of an actuator structure used to drive the MEMS mirror 12. The actuator structure of the MEMS mirror 12 further includes the suspension structure discussed above. Thus, the MEMS driver 25 may further include a measurement circuit configured to measure one or more characteristics of the MEMS mirror 12 described herein. The MEMS driver 25 may further include processing circuitry, including at least one processor (e.g., analog signal processing circuitry and/or digital signal processing circuitry) configured to process measurement information from the measurement circuit to evaluate a mechanical health of the MEMS mirror 12 and/or the state of the chip package.

Additionally, or alternatively, the system controller 23 may receive measurement information from the measurement circuit of the MEMS driver 25 and perform processing thereon. Thus, system controller 23 may further include processing circuitry, including at least one processor (e.g., analog signal processing circuitry and/or digital signal processing circuitry) configured to process measurement information from the measurement circuit to evaluate a mechanical health of the MEMS mirror 12 and/or the state of the chip package.

By sensing the rotation position of the MEMS mirror 12 about its rotation axis 13, the MEMS driver 25 can sense zero-crossing events of the MEMS mirror 12. A zero-crossing event is an instance when the MEMS mirror 12 has a rotation angle of 0° on its rotation axis 13. Specifically, it is the moment when the MEMS mirror 12 is parallel to the frame or in a neutral position. The neutral position may also be referred to as a resting position (e.g., when the MEMS mirror 12 comes to a stop after turning off the driving force). Since the MEMS mirror 12 oscillates back and forth between two rotation directions (e.g., clock-wise and counter-clockwise), a zero-crossing event occurs twice during a scanning period—once as the mirror oscillates in the first rotation direction and once as the mirror oscillates in the second rotation direction. It will also be appreciated that angle-crossing events at another predefined angle may also be used instead of a zero-crossing event.

In some embodiments, an event time may correspond to a non-zero-crossing event. For example, the sensed rotation angle may be some angle other than 0°. However, for the purpose of explanation, examples herein will be described in the context of sensing zero-crossing events.

The MEMS driver 25 is configured to detect each zero-crossing event and record a timing for each event. This timing information (i.e., measured zero-crossing time) can then be transmitted to the system controller 23 as position information. Specifically, the MEMS driver 25 triggers a change in the output of a position signal (position_L) at each zero-crossing event or angle-crossing event.

Figure 3:
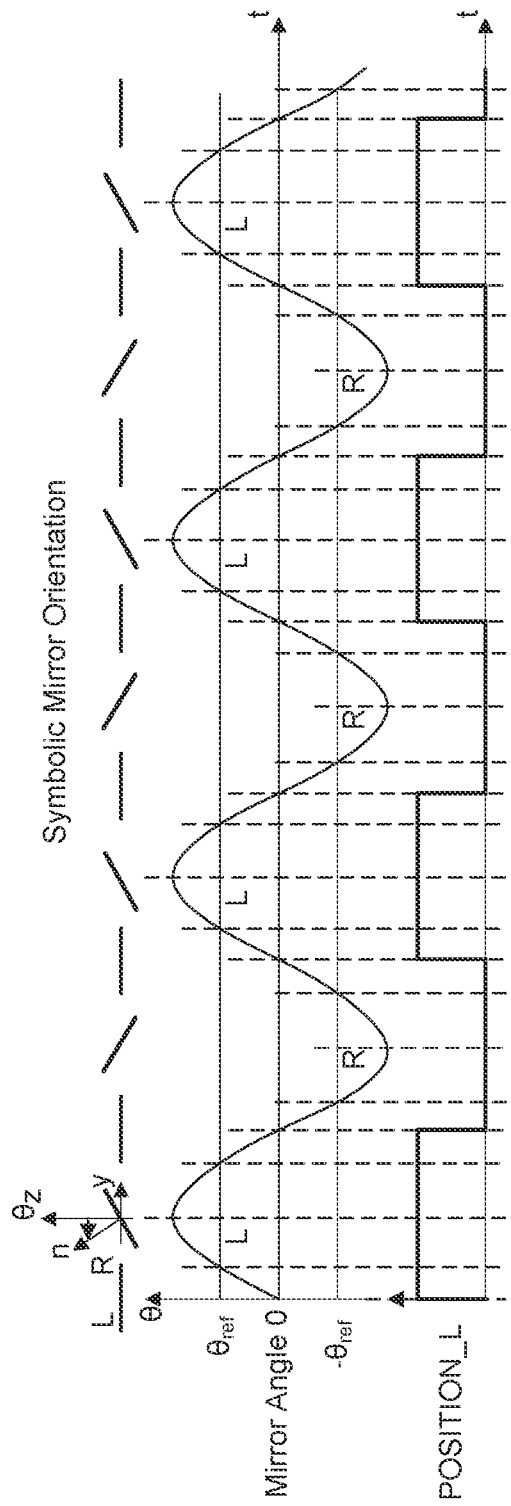
FIG. 3 illustrates a signal diagram of various signals generated by a MEMS driver based on a mirror angle θ and/or position according to one or more embodiments.

FIG. 3 illustrates a signal diagram of various signals generated by a MEMS driver 25 based on the mirror angle θ and/or position, including a position signal (position_L). For example, the position signal (position_L) may be a pulsed signal during which a first pulse transition (e.g., falling-edge transition) is triggered at a zero-crossing as the mirror oscillates in a first rotation direction (e.g., from left to right) and a second pulse transition (e.g., rising-edge transition) is triggered at a zero-crossing as the mirror oscillates in a second rotation direction (e.g., from right to left). Furthermore, the signal is "high" when the mirror points in one direction (e.g., points left) and the signal is "low" when the mirror points in a second direction (e.g., points right). Thus, the position signal not only indicates a zero-crossing event by triggering a pulse transition, but also indicates absolute phase information by indicating the directional tilt of the mirror. As the interval between zero-crossing events increase, so does the frequency of the position signal. Based on this position signal both a phase and/or a frequency of two or more position signals can be compared.

Alternatively, a short pulse may be generated by the MEMS driver 25 at the each zero-crossing event such that a pulsed position signal (position_L) is output to the system controller 23. That is, the signal remains low (or high) between zero-crossing pulses. In this case, the absolute phase information indicating which direction the mirror is moving would be absent. Based on this position signal a phase and/or a frequency of two or more position signals can be compared.

The MEMS driver 25 may send the position information to the system controller 23 so that the system controller 23 can use the position information to control the triggering of the laser pulses of the illumination unit 10 and the activation of the photodiodes of the photodetector array 15. The position information may also be used by the system controller as feedback information such that the system controller 23 can maintain a stable operation of the MEMS mirror 12 via control signals provided to the MEMS driver 25 and also maintain synchronization with other MEMS mirrors.

The MEMS mirror 12 includes an actuator structure used to drive the mirror. The actuator structure includes inter-digitated finger electrodes made of interdigitated mirror combs and frame combs to which a drive voltage (i.e., an actuation or driving signal) is applied by the MEMS driver 25. The drive voltage may be referred to as a high-voltage (HV). The drive voltage applied to the finger structure generates a corresponding capacitance. The drive voltage across the finger structure creates a driving force between interdigitated mirror comb electrodes and the frame comb electrodes, which creates a torque on the mirror body 8 about the rotation axis. The drive voltage can be switched or toggled on and off resulting in an oscillating driving force. The oscillating driving force causes the mirror to oscillate back and forth on its rotation axis between two extrema. Depending on the configuration, this actuation can be regulated or adjusted by adjusting the drive voltage off time, a voltage level of the drive voltage, or a duty cycle.

In other embodiments, an electromagnetic actuator may be used to drive the MEMS mirror 12. For an electromagnetic actuator, a driving current (i.e., an actuation or driving signal) may be used to generate the oscillating driving force. Thus, it will be appreciated that drive/driving voltage and drive/driving current may be used interchangeably herein to indicate an actuation signal or a driving signal, and both may generally be referred to as a driving force.

As the mirror oscillates, the capacitance or charge between the finger electrodes changes according to the mirror's rotation position. The MEMS driver 25 is configured to measure the capacitance or charge between the interdigitated finger electrodes, and determine a rotation position or angle position of the MEMS mirror 12 therefrom. By monitoring the capacitance or charge, the MEMS driver 25 can detect the zero-crossing events and a timing thereof, and can determine the deflection or the tilt angle of the MEMS mirror 12 at any given moment. The MEMS driver 25 can also use the measured capacitance to determine a mirror frequency, and record the information in memory at the MEMS driver 25 or at the system controller 23.

The sensing of the position of the MEMS mirror 12 is performed based on a detector that is configured to measure the capacitance or charge. For example, as the MEMS mirror moves, the geometry of the finger structure changes, resulting in a change in the geometry of the capacitance. As the geometry of the capacitance changes, the capacitance itself changes. Thus, a specific capacitance corresponds directly with a specific deflection position (e.g., tilt angle) of the MEMS mirror. By sensing the capacitance of the finger structure, the MEMS driver 25 can monitor and track the oscillations of the mirror, and determine a specific position of the MEMS mirror, including the zero-crossing.

One way to measure the capacitance is to measure a current flowing through the finger electrode structure, convert the measured current into a voltage, and then further correlate the voltage to a capacitance and/or a rotation angle $\theta$. However, any method to measure the capacitance may be used. A rotation direction (e.g., positive or negative, left-to-right or right-to-left, clockwise or counter-clockwise, etc.) is also detected by measuring a change in capacitance over time, where a positive or a negative change indicates opposing rotation directions. The MEMS driver 25 can also record the currents and voltages measured during the measuring of the capacitance. Thus, increasing the accuracy of position sensing of the mirror may improve the overall accuracy of the LIDAR system Since the mirror is driven at an oscillation frequency (e.g., 2 kHz), when the mirror rotates in a first rotation direction (e.g., left-to-right or clockwise), it crosses a zero position (i.e., 0°) at a certain point of time. The same can be said when the mirror rotates in a second rotation direction (e.g., right-to-left or counter-clockwise), the mirror will cross the zero position at a certain point in time. These instances of crossing the zero position may be referred to as zero-crossing events which occur at zero-crossing times.

Figure 4:
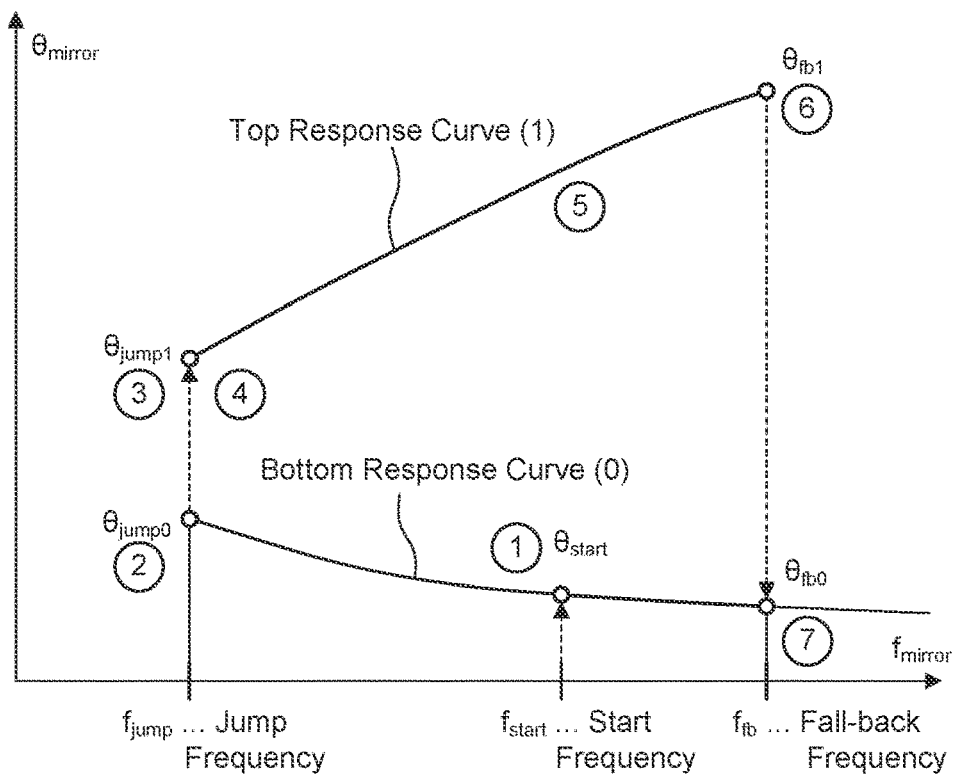
FIG. 4 illustrates an angle amplitude-frequency response curve of a micromirror device according to one or more embodiments.

FIG. 4 illustrates an angle amplitude-frequency response curve of a micromirror device according to one or more embodiments. Specifically, FIG. 4 plots the mirror angle $\theta_{mirror}$ vs. the mirror frequency $f_m$ of the MEMS mirror 12. Both axes in the plot are in arbitrary units. The complete response curve includes a top response curve (1) and a bottom response curve (0). The top response curve (1) may also be referred to as an operating response curve, where the frequency is swept across the operating range. In contrast, the bottom response curve (0) may be referred to as a non-operating response curve that exists before amplitude operating range is achieved. The complete response curve may be measured and stored in memory of the LIDAR system 200 (e.g., in the system controller 23).

The flow of the operation of the MEMS mirror progresses from point 1 to point 7, during which constant drive voltage is applied to the MEMS mirror 12 by the MEMS driver 25, will now be described. Here, "constant drive voltage" refers to the drive voltage being the same voltage when actuated (i.e., toggled on). However, it will be understood that the drive voltage is being toggled on and off in order to produce the mirror oscillation.

As noted in the previous paragraph, all points on the graph are operating at the same drive voltage provided by the MEMS driver 25. The drive voltage only stretches or compresses the curve (i.e., a higher frequency and a higher tilt angle can be reached due to more energy put it by a higher drive voltage).

The operation of the MEMS mirror starts at point 1 on the bottom response curve (0) where, at start frequency $f_{start}$. Here, the MEMS driver 25 starts the drive voltage signal to the MEMS mirror 12. In response, the MEMS mirror 12 will start to move a bit (e.g., at a low angle), depending on the value of $f_{start}$. Starting at the start frequency $f_{start}$, the mirror frequency is swept down (i.e., decreasing, right to left).

The frequency is lowered in order for the mirror to synchronize with the drive signal provided (i.e., to decrease the phase offset between the two). As more energy (i.e., constant drive voltage) is applied over time, the mirror continues to move slightly outside of resonance until the jump frequency $f_{jump}$ (point 2). That is, the mirror frequency continues to be lowered until an instability point is found and the amplitude of the mirror oscillation increases at point 2 (180 phase shift, hence jump). At the jump frequency, the mirror phase shifts 180 degrees from $\theta_{jump0}$ (point 2) to $\theta_{jump1}$ (point 3) where the energy put in is transferred into motion.

At point 4, and the mirror frequency $f_m$ starts to sweep up (i.e., increasing, left to right). The mirror phase may continue to increase along the top response curve. At point 5, the mirror is in a stable operating region (in phase, but offset). The mirror may be in an optimal resonance at point 5. However, if the mirror frequency continues to increase to point 6, the mirror phase reaches a fallback phase $\theta=\theta_{fb1}$ at a fallback frequency $f_{fb}$. Thus, the tilt angle of the mirror is at a maximum just prior to this tipping point at point 6.

The fallback frequency $f_{fb}$ is the maximum frequency the mirror can maintain at the established drive voltage. The fallback point or tipping point is the point where the potential energy put in the mirror system by the drive voltage is equal to the kinetic energy opposing it by the mirror system (in phase, no offset), pushing it over this point disturbs the balance and resonance is lost. Thus, at point 6, there is not enough energy in the system to maintain the mirror phase and the phase shifts 180 degrees and falls back to the bottom response curve (0) at fallback phase $\theta_{fb0}$.

Point 7 is the fallback point on the bottom response curve (0) and is the phase angle the mirror falls back to. This phase angle is not necessarily zero degrees since the drive voltage is still present, but the mirror is no longer in phase. The cycle can start again at point 7 or at point 1.

Embodiments further relate to a self-sensing motion estimation (i.e., rotation position sensing) for control feedback of resonantly driven MEMS oscillators or oscillating mirrors. The aim is a stable operation of the oscillating structure by active feedback control. In particular, the self-sensing method includes generating mirror state feedback information by an observer—a processing circuit that generates the mirror state feedback information (i.e., estimated position information) based on the charge between two drive electrodes of a drive capacitor of the oscillating structure. The observer may also be referred to as an "estimator" and may be used interchangeably with "observer." The mirror state feedback provided from the observer to the controller closes the control loop to provide high precision control of the oscillating structure, and, more particularly, to provide high precision control of the transmission angle/direction of a transmitted laser beam.

The observer may take advantage of the electrostatic transducer charge of the oscillating structure by integrating displacement currents (i.e., MEMS mirror current) of the drive capacitors. In other words, the charge between the interdigitated finger electrodes is measured. Using a known capacitance function and the driving voltage, the actual motion is derived from the measured charge. This result is fed into a processor or processing circuit that applies a model-based observer with a switched input. Resonant electrostatic MEMS mirrors are typically driven in parametric resonance using a rectangular voltage. During a voltage zero time, no measurement is available and the full mirror motion is estimated by the observer.

The self-sensing approach is advantageous because it is only dependent on the extremely precisely micro-manufactured geometry of the electrostatic comb drive, which results in high robustness towards disturbances like temperature or pressure changes.

By integrating the displacement currents, the position estimation is less sensitive to changes of current from parasitic modes. Furthermore, phase detection with current sensing is realized during zero crossing, which is only available for a mirror running in the upper response curve of a progressively stiffening structure. The proposed charge sensing does not need stiffening spring behavior for zero crossing detection and can also run with constant or softening springs.

Finally, one or more embodiments samples the full charge curve to estimate the mirror position and can therefore be more accurate.

Figure 5:
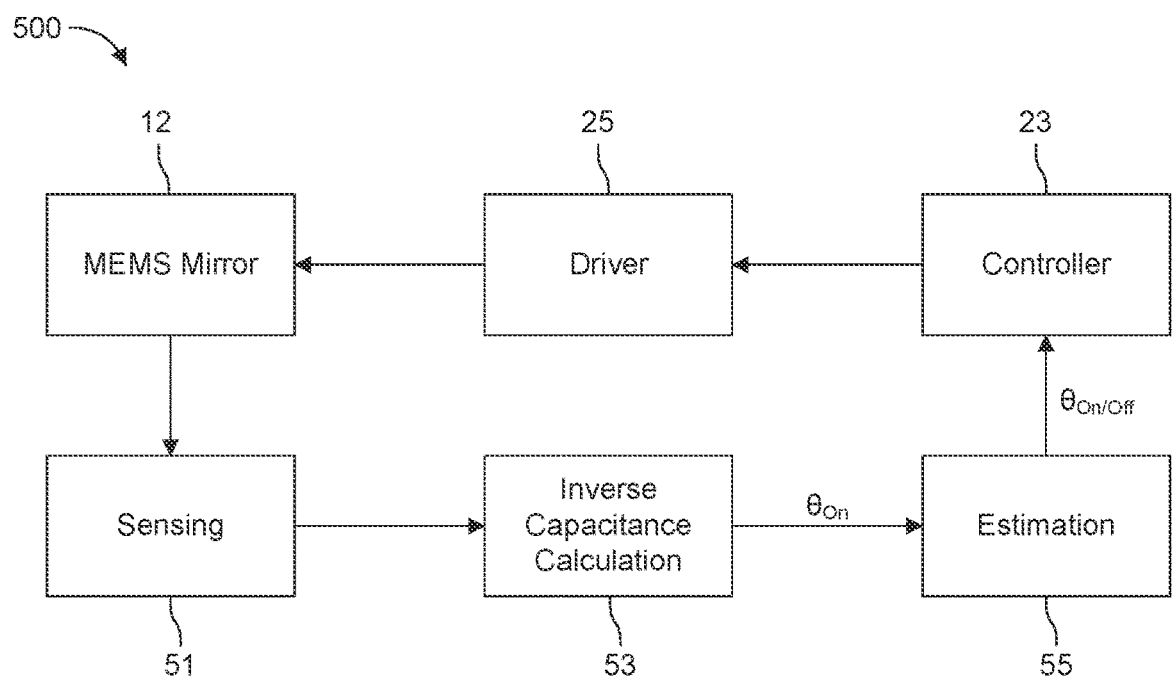
FIG. 5 illustrates a schematic block diagram of a position sensing system in accordance with one or more embodiments.

FIG. 5 illustrates a schematic block diagram of a position sensing system 500 in accordance with one or more embodiments. The position sensing system 500 includes an electrostatic MEMS mirror 12, a MEMS driver 25, and a system controller 23, as described herein. In addition, the position sensing system 500 includes a sensing circuit 51, an inverse capacitance calculation unit 53, and an observer 55.

The inverse capacitance calculation unit 53 includes processing circuitry that receives sensor signals from the sensing circuit 51 and calculates a defection of the MEMS mirror 12 based thereon. The deflection may be a tilt angle θ, a rotation angle, a deflection angle, mirror position, rotation position, or any deviation or displacement of the MEMS mirror 12 from its resting position. The calculated deflection is output from the inverse capacitance calculation unit 53 to the observer 55.

In general, inverse capacitance calculation unit 53 is only capable of measuring the deflection during an on-time of the drive voltage. Since the on-time component of the drive voltage alternates with an off-time of the drive voltage, it can be said that the on-time is discontinuous. Thus, it can also be said that the inverse capacitance calculation unit 53 provides a discontinuous measurement of the deflection to the observer 55.

The observer 55 is configured to estimate a deflection of the MEMS mirror 12 that corresponds to the off-time of the drive voltage applying the discontinuous measurement of the deflection made by the inverse capacitance calculation unit 53 to a system model of the MEMS mirror 12. In other words, the driving signal (i.e., the drive voltage) is time-varying driving signal that comprises an on-time component that alternates with an off-time component. The inverse capacitance calculation unit 53 measures an on-time deflection corresponding to a movement of the MEMS mirror 12 during the on-time component of the driving signal, and provides the measured on-time deflection $\theta_{on}$ to the observer 55. The observer 55 estimates an off-time deflection angle corresponding to a movement of the MEMS mirror 12 during the off-time component of the driving signal based on the measured on-time deflection and the system model, and outputs a continuous measurement of the deflection $\theta_{on/off}$, including both the on-time deflection and the off-time deflection.

Specifically, the observer 55 applies the measured on-time deflection to the system model to predict the behavior of the movement of the MEMS mirror 12 during the off-time component of the driving signal. Based on this prediction, the observer 55 estimates the off-time deflection. The observer 55 may be provided the deflection magnitude and direction as well as mirror phase as position information to the system controller 23.

As such, the observer 55 receives a discontinuous measurement signal of the deflection and generates a continuous measurement signal of the deflection. The system controller 23 may receive the continuous measurement signal, which includes a continuous measurement of the deflection—including on-time deflection and off-time deflection—and may regulate the driving signal generated by the driver 25 based on the measured on-time deflection and the estimated off-time deflection provided by the continuous measurement signal.

The system controller 23 may adjust the control of the MEMS mirror 12, for example, by adjusting a characteristic of the drive voltage, based on the deflection and/or phase information provided in the continuous measurement signal. Together, the elements shown in FIG. 5 form a closed control loop for controlling the MEMS mirror 12.

Figure 6:
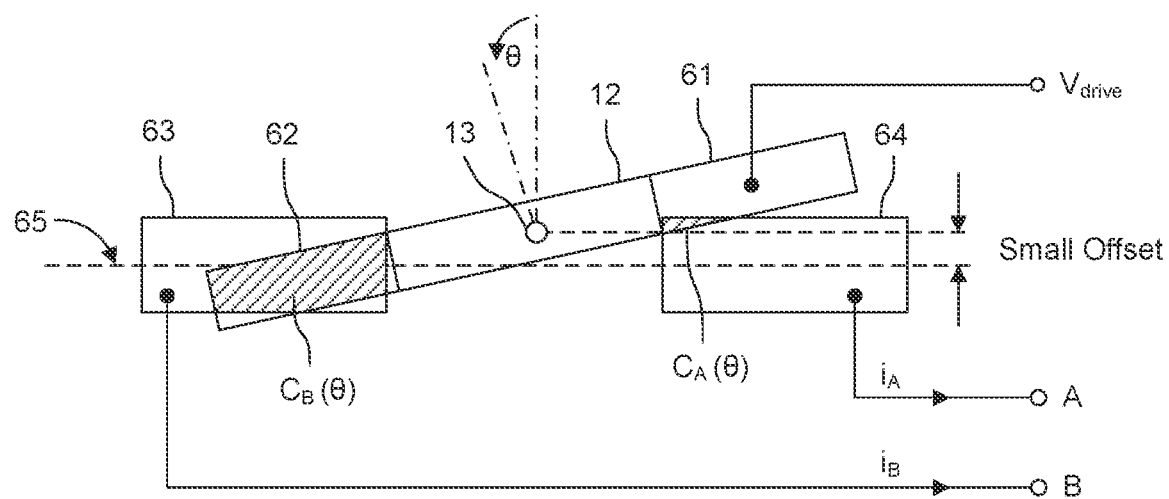
FIG. 6 illustrates a cross-sectional view of a MEMS mirror and driver electrodes in accordance with one or more embodiments.

FIG. 6 illustrates a cross-sectional view of a MEMS mirror 12 and driver electrodes in accordance with one or more embodiments. In particular, MEMS mirror 12 is shown rotating on a rotation axis 13 that extends orthogonal to the page. The MEMS mirror 12 includes mirror comb electrodes 61 and 62 to which a drive voltage $v_{drive}$ is applied. As described above, the MEMS mirror 12 is supported by a mirror frame 17 (not illustrated). The mirror frame 17 includes static comb electrodes 63 and 64. Whereas the mirror comb electrodes 61 and 62, coupled to opposing ends of the mirror body 8, move along with the oscillation of the MEMS mirror 12.

A first drive capacitor $C_A$ (also referred to as $C_A(\theta)$) is formed by an overlap of electrodes 61 and 64. The overlap of the two electrodes 61 and 64 varies with the rotation angle θ of the MEMS mirror 12 about the rotation axis 13. As the overlap increases, so does the capacitance of the first drive capacitor $C_A$. Conversely, the capacitance of the first drive capacitor $C_A$ decreases as the overlap decreases.

Similarly, a second drive capacitor $C_B$ (also referred to as $C_B(\theta)$) is formed by an overlap of electrodes 62 and 63. The overlap of the two electrodes 62 and 63 varies with the rotation angle θ of the MEMS mirror 12 about the rotation axis 13. As the overlap increases, so does the capacitance of the second drive capacitor $C_B$. Conversely, the capacitance of the second drive capacitor $C_B$ decreases as the overlap decreases.

Thus, the first drive capacitor $C_A$ is a function of the rotation angle θ that stores a first charge based on the rotation angle θ of the MEMS mirror 12 resulting in a first displacement current iA that is also dependent on the rotation angle θ of the MEMS mirror 12. Similarly, the second drive capacitor $C_B$ is also a function of the rotation angle θ that stores a second charge based on the rotation angle of the MEMS mirror 12 resulting in a second displacement current iB that is also dependent on the rotation angle of the MEMS mirror 12. The two drive capacitors each have an asymmetric characteristic according to the deflection direction (e.g., the tilt direction) of the MEMS mirror 12.

A displacement current passes between electrodes of a drive capacitor when a time-varying voltage is applied to its electrodes. It flows because of changing electric displacement with time. Since the capacitance of a drive capacitor is changing with changing angle, the displacement current also changes based on the changing angle.

The drive voltage $v_{drive}$ induces a driving force between interdigitated mirror comb electrodes 61, 62 and the static comb electrodes 63, 64. In particular, the MEMS mirror 12 is driven in parametric resonance by a square wave voltage with 50% (or different) duty cycle. During the off period of the drive voltage $v_{drive}$, the MEMS mirror oscillates freely. As a result, the self-sensing of the mirror position is only available during voltage on-time, which—for a 50% duty cycle—means half the time. Depending on the amplitude and the frequency state the MEMS mirror 12, the maximum tilt amplitude or the zero crossing is measured during voltage on-time of the drive voltage $v_{drive}$. Therefore, the corresponding off-time parameter needs to be estimated to enable a full state feedback or to enable amplitude and phase control with a phase locked loop (PLL).

Each the static comb electrode 63 and 64 provide a displacement current iA and iB, respectively, due to the mirror oscillation. For example, as the MEMS mirror 12 rotates, an offset of the rotation axis 13 to a symmetry axis 65 of the static comb electrodes 63 and 64 occurs. The displacement currents iA and iB are representative of this offset (i.e., displacement). Thus, since the displacement currents iA and iB differ depending from which side the mirror electrodes 61 and 62 pass their corresponding static comb electrode 63, 64, the deflection direction (e.g., tilt direction) of the MEMS mirror 12 can be detected using the displacement currents iA and iB.

Figure 7:
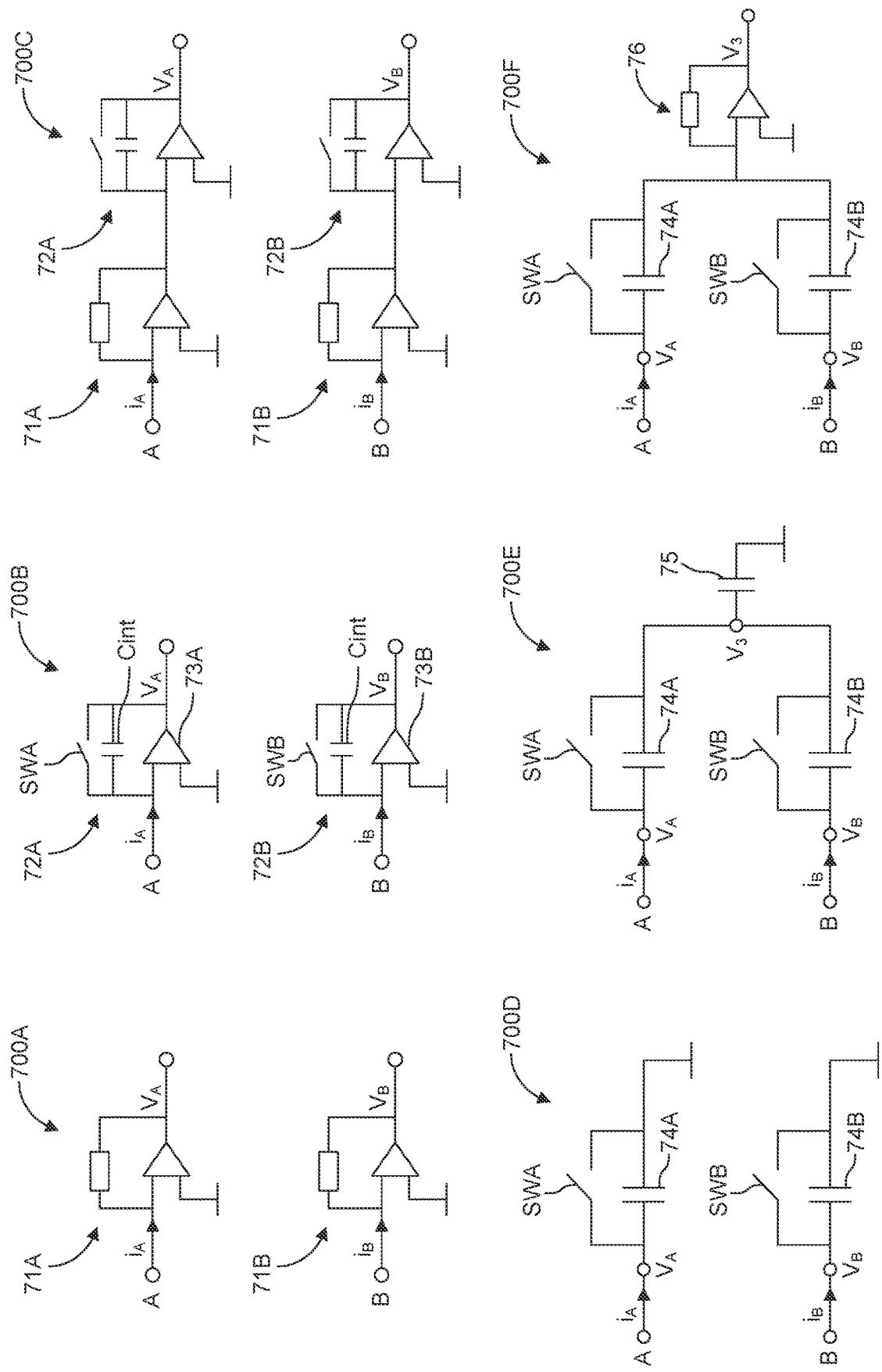
FIG. 7 illustrates schematic block diagrams of various types of charge and current sensing circuits according to one or more embodiments.

FIG. 7 illustrates schematic block diagrams of various types of charge and current sensing circuits 700A-700F according to one or more embodiments. In particular, the sensing circuits shown in FIG. 7 correspond to the sensing circuit 51 in FIG. 5. Each sensing circuit 700A-700F includes a first input A that is coupled to static comb electrode 63 to receive displacement current iA and a second input B that is coupled to static comb electrode 64 to receive displacement current iB. Furthermore, each sensing circuit 700A-700F includes one or more of the following circuits, including a combination thereof.

The sensing circuit 51 may include a transimpedance amplifier (TIA) that measures the corresponding displacement current iA, iB by converting the displacement current into a voltage vA or vB, respectively. Thus, the sensing circuit 700A shown in FIG. 7 includes a first TIA 71A and a second TIA 71B.

The sensing circuit 51 may include a switched charge integrator (CI) that measures a charge of a drive capacitor corresponding to static comb electrode 63 or 64 by collecting and integrating the corresponding displacement current iA, iB. The current integration is implemented with an operational amplifier (OPA) circuit with two individual channels, one for each displacement current iA and iB (see e.g., sensing circuit 700B). Each channel's displacement current iA or iB is integrated by an operational amplifier using a capacitive feedback $C_{int}$, and the integrated displacement current is output a voltage vA or vB, respectively. The voltages vA and vB are representative of the charge at the corresponding static comb electrode 63 or 64.

Thus, the sensing circuit 700B shown in FIG. 7 includes a first switched charge integrator 72A that includes a first operational amplifier 73A, a first feedback capacitor $C_{intA}$ arranged in a first negative feedback path of the first operational amplifier 73A, and a switch SWA arranged in a second negative feedback path of the first operational amplifier 73A in parallel to the first negative feedback path.

Additionally, the sensing circuit 700B includes a second switched charge integrator 72B that includes a second operational amplifier 73B, a second feedback capacitor $C_{intB}$ arranged in a first negative feedback path of the second operational amplifier 73B, and a switch SWB arranged in a second negative feedback path of the second operational amplifier 73BA in parallel to the first negative feedback path.

The switches SWA and SWB for the charge integrators are closed during voltage-off time of the drive voltage $v_{drive}$ to discharge the floating potential of the capacitor. During the voltage-off time of the drive voltage $v_{drive}$, the drive voltage $v_{drive}$ is at its minimum value, which typically zero. Thus, the switches SWA and SWB are open during the voltage-on time of the drive voltage $v_{drive}$ to enable charging of its corresponding capacitor. This switching states of the switches SWA and SWB may be controlled by the driver 25 or by a circuit that detects the voltage-off time. Another solution instead of using switches can be a high ohmic resistor whose influence on the charge measurement is neglectable.

The sensing circuit 51 may include a transimpedance amplifier (TIA) and a switched charge integrator (CI) coupled in series. In particular, the sensing circuit 700C shown in FIG. 7 includes the first TIA 71A having its output coupled to the input of the first switched charge integrator 72A. The first TIA 71A is configured to receive the displacement current iA and provide a converted voltage representative of the displacement current iA to the operational amplifier of the first switched charge integrator 72A. The first switched charge integrator 72A, in turn, generates voltage vA representative of the charge at the corresponding static comb electrode 63 based on that converted voltage.

The sensing circuit 700C further includes the second TIA 71B having its output coupled to the input of the second switched charge integrator 72B. The second TIA 71B is configured to receive the displacement current iB and provide a converted voltage representative of the displacement current iB to the operational amplifier of the second switched charge integrator 72B. In turn, the second switched charge integrator 72B generates voltage vB representative of the charge at the corresponding static comb electrode 64 based on that converted voltage.

The charge measurement is less influence by high parasitic mode oscillations and the current measurement is more precise zero crossing for phase detection. Thus, the combination can be useful when both the charge and the displacement current are measured at the same time to improve sensing quality.

The sensing circuit 51 may include a switched series capacitor for each displacement current channel that measures the charge of the drive capacitor by collecting the respective displacement current. In response to receiving a displacement current, the capacitor is charged and a voltage (i.e., a voltage drop) is produced across the capacitor as the displacement current is collected and stored.

As such, the sensing circuit 700D shown in FIG. 7 includes a first switched series capacitor 74A that receives the displacement current iA and generates a voltage vA based on the displacement current IA. A switch SWA is coupled in parallel to the first switched series capacitor 74A, to the input and the output of the first switched series capacitor 74A.

Similarly, the sensing circuit 700D includes a second switched series capacitor 74B that receives the displacement current iB and generates a voltage vB based on the displacement current iB. A switch SWB is coupled in parallel to the second switched series capacitor 74B, to the input and the output of the second switched series capacitor 74B. The switches SWA and SWB are closed during voltage-off time of the drive voltage $v_{drive}$ to discharge the floating potential of the capacitor.

The sensing circuit 51 may include a capacitance network in which the two displacement current channels are coupled to an input of a third capacitor 75. As such, the sensing circuit 700E shown in FIG. 7 implements the arrangement used in sensing circuit 700D, but additionally includes a third capacitor 75 having and input that is coupled to the outputs of both capacitors 74A and 74B, resulting in a third voltage drop v3 across the capacitor 75. Voltage v3 may be used to identify the mirror tilt angle amplitude θ.

The sensing circuit 51 may include switched series capacitors 74A and 74B in combination with a TIA 76, as shown in the sensing circuit 700F. Thus, the sensing circuit 700F is similar to the arrangement of the sensing circuit 700E, except the third capacitor 75 is replaced with the TIA 76. The TIA 76 outputs a third voltage v3 that may be used to identify the mirror tilt angle amplitude θ.

It will be appreciated that other combinations of the aforementioned sensing circuit components are also possible as long as the displacement currents and/or the charges of the drive capacitors are being measured. By principle a TIA measures a displacement current. Both switched current integrators (CI) and capacitors measure a charge by collecting or integrating the displacement current.

Embodiments using a current integrator, such as sensing circuits 700A, 700B, and 700C, will now be discussed in further detail. Integrating a displacement current i of an electrostatic MEMS mirror comb drive, reveals the charge according to the deflection θ dependent capacitance function C(θ) of a drive capacitor and the applied voltage $v_{drive}$ (i.e., drive voltage $v_{drive}$) according to Equation 1:

$$q = \int_0^t i \, dt = C(\theta) \cdot v_{drive} \quad \text{Eq. (1)}$$

The capacitance function C(θ) is determined from a prior simulation or measurement during system modeling of the MEMS mirror 12 and the actuator. The actual mirror deflection angle θ (e.g., tilt angle θ) can be calculated with an inverse of the capacitance function $C^{-1}$ programmed in memory of a processing unit according to Equation 2:

$$\theta = C^{-1}\left(\frac{\int_0^t i \, dt}{v_{drive}}\right) \quad \text{Eq. (2)}$$

If the comb drive has at least one layer or mirror electrode that is out-of-plane with respect to the mirror electrode resting position (i.e., tilt angle is 0°), the deflection/tilt direction of the motion can be detected from both sensing electrodes of the drive capacitors $C_A$ and $C_B$.

As can be seen from Equation 2, no measurement is available during the voltage-off time of the rectangular drive voltage since the deflection angle θ from Equation 2 becomes infinity. Therefore, a model-based observer 55 runs in parallel, which is fed with measured charges derived from voltages vA and vB during voltage-on time and provides an estimated position of the deflection angle θ of the mirror 12 during voltage-off time.

Figure 8:
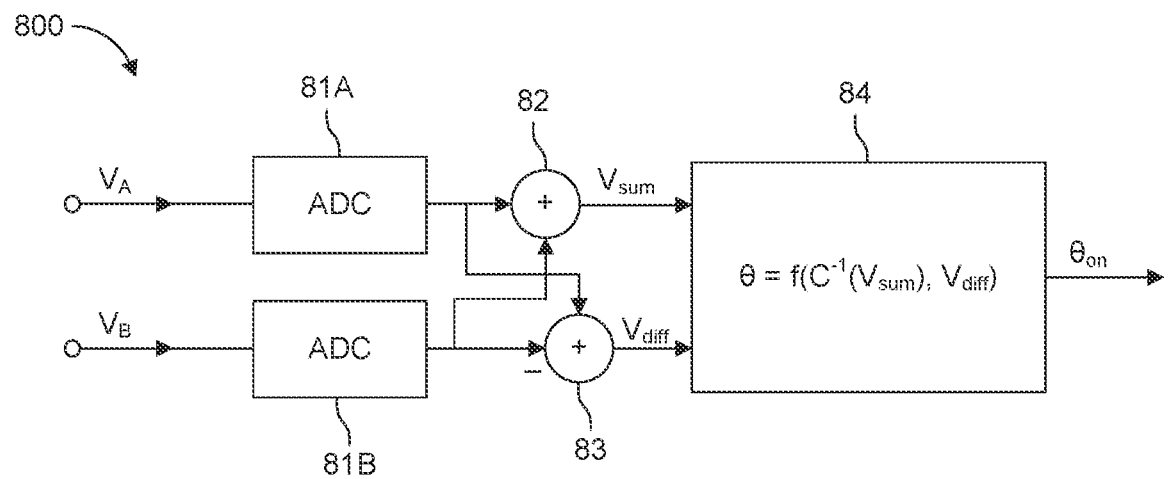
FIG. 8 illustrates a schematic block diagram of a measuring circuit according to one or more embodiments.

FIG. 8 illustrates a schematic block diagram of a measuring circuit 800 according to one or more embodiments. In particular, the measuring circuit 800 is representative of the inverse capacitance calculation unit 53 shown in FIG. 5. The measuring circuit 800 includes two input nodes that tap (i.e., receive) the voltages vA and Vb from one of the sensing circuits 700A-700D shown in FIG. 7. The voltages vA and vB are provided to a respective analog-to-digital converter (ADC) 81A or 81B that converts their respective analog voltage vA and vB into its digital counterpart.

The (digital) voltages vA and vB are then added by a summer 82 to generate a summed voltage vSum. The (digital) voltages vA and vB are also subtracted (e.g., vDiff=vA−vB) by a subtractor 83 or by an adder with an inverted input to generate a difference voltage vDiff. The summed voltage vSum provides a high signal-to-noise ratio, while the difference voltage vDiff enables the detection of the deflection direction of the mirror 12 indicated by the sign of the difference voltage vDiff. Thus, summed voltage vSum represents the full charge and may be used to determine the deflection or tilt angle θ of the mirror 12, whereas the difference voltage vDiff is used to detect the direction of mirror deflection/tilt.

For example, a negative sign of the difference voltage vDiff may indicate that the mirror comb electrode 62 is positioned lower than the mirror comb electrodes 61 (i.e., the mirror comb electrode 62 is lower than the resting plane and the mirror comb electrode 61 is higher than the resting plane) and a positive sign of the difference voltage vDiff may indicate that the mirror comb electrodes 62 is positioned higher than the mirror comb electrodes 61. (i.e., the mirror comb electrode 62 is higher than the resting plane and the mirror comb electrode 61 is lower than the resting plane).

It will be further appreciated that the summation and the subtraction of signals can be realized digitally, as described, or in the analog domain via analog circuit components.

The measuring circuit 800 further includes a processing unit 84 comprising a processor and/or processing circuitry that is programmed with a non-linear function to calculate the deflection angle $\theta_{on}$ and the deflection direction of the mirror 12. The processing unit 84 receives the summed voltage vSum and the difference voltage vDiff and applies vSum and vDiff to the non-linear function to calculate the calculate the deflection angle $\theta_{on}$ and deflection direction of the mirror 12.

To determine the deflection angle magnitude |θ|, the processing unit 84 applies the summed voltage vSum to an inverse capacitance function $C^{-1}$ programmed in memory of the processing unit 84 and represented by Equation 3:

$$|\theta| = C^{-1}\left(\left|C_{int} \cdot \frac{v_{sum}}{v_{drive}}\right|\right). \quad \text{Eq. (3)}$$

Here, $C_{int}$ is the capacitance of feedback capacitors $C_{intA}$ and $C_{intB}$, which have the same capacitance, and $v_{drive}$ is the drive voltage.

The processing unit 84 also extracts the sign of the difference voltage vDiff (i.e., sign(vDiff)) and multiplies the sign (i.e., 1 or −1) with the determined deflection angle magnitude. Thus, the full non-linear function applied by the processing unit 84 can be represented by Equation 4:

$$\theta \text{ on} = \text{sign}(v_{diff}) \cdot C^{-1}\left(\left|C_{int} \cdot \frac{v_{sum}}{v_{drive}}\right|\right). \quad \text{Eq. (4)}$$

From a prior calibration the capacitance or respective current curves are known for each drive capacitor, where $C_A$ represents the first drive capacitor and $C_B$ represents the second drive capacitor. This calibration can be realized by enabling a decay oscillation from the maximum deflection angle of the mirror 12, while keeping the drive voltage $v_{drive}$ at a high state. This type of decay oscillation may also be referred to as an active decay. In parallel, the angle of the mirror is measured optically by a position sensitive device (PSD). For the capacitance networks and the charge integrators the following equations 5 and 6 are used:

$$C_A = -C_{int} \cdot \frac{v_A}{v_{drive}} \quad \text{Eq. (5)}$$

$$C_B = -C_{int} \cdot \frac{v_B}{v_{drive}} \quad \text{Eq. (6)}$$

Figure 9:
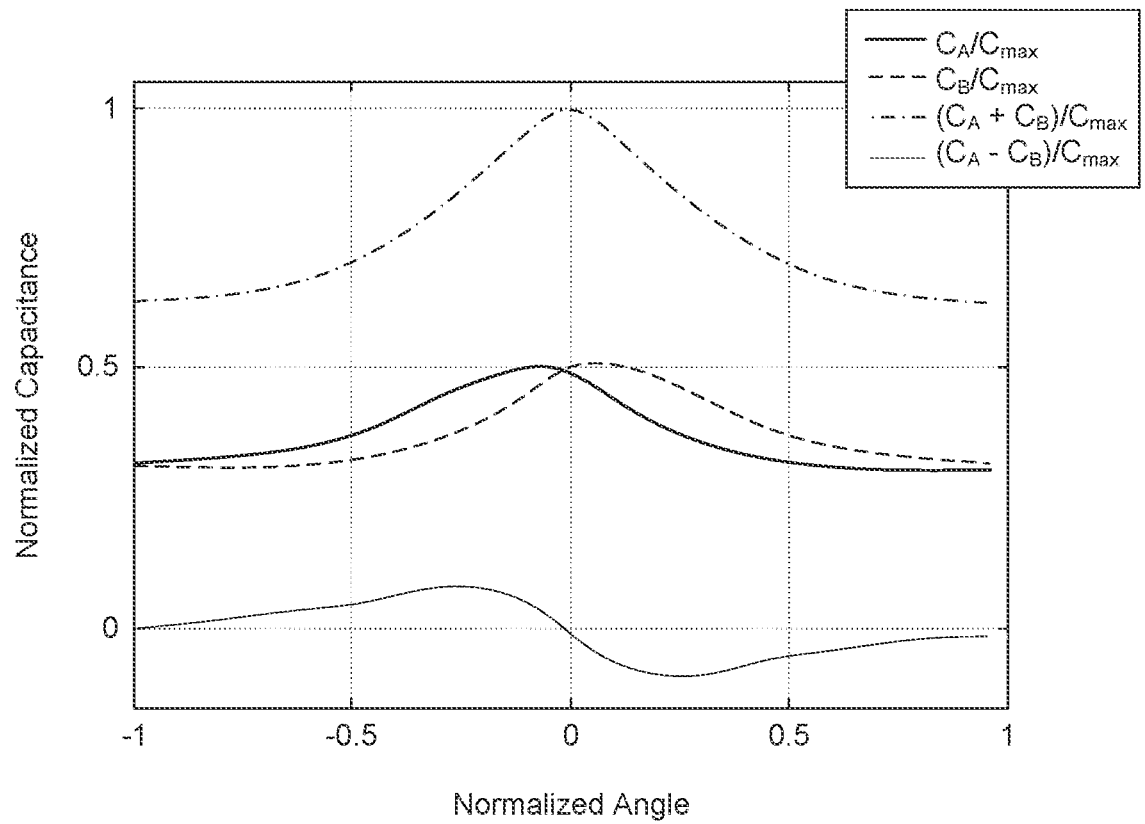
FIG. 9 illustrates normalized capacitance curves over a deflection angle measured from an active decay measurement.
Figure 10:
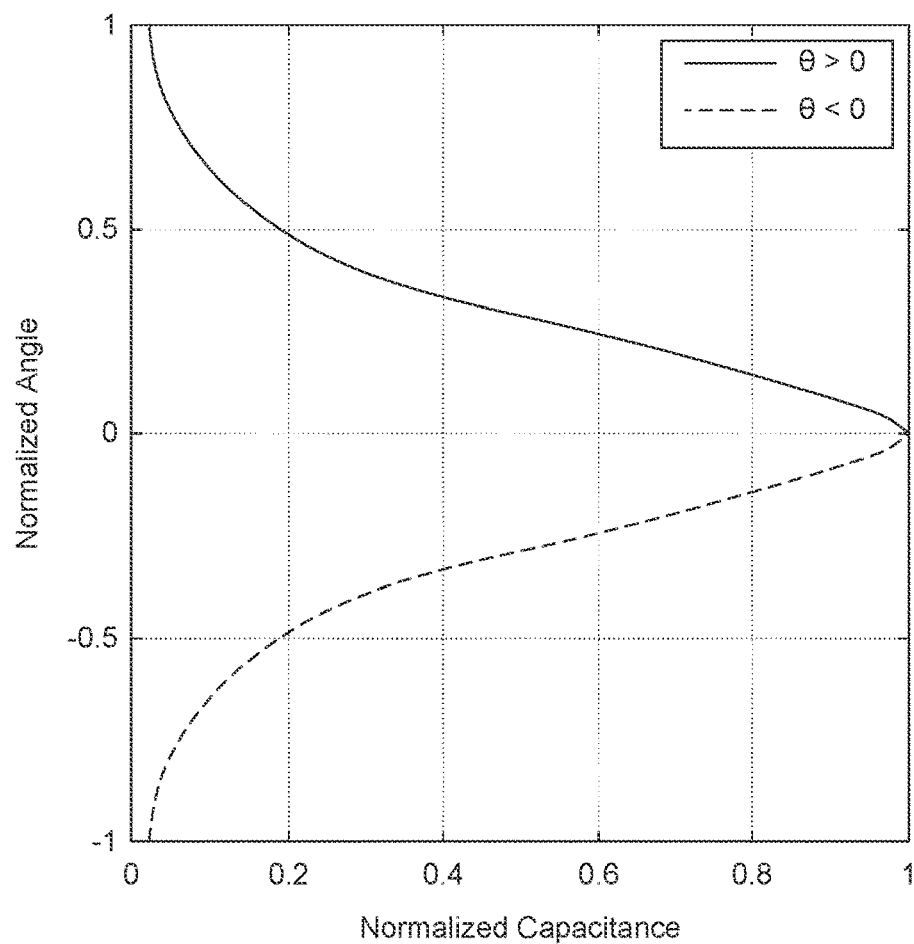
FIG. 10 shows a normalized capacitance curve over a deflection angle measured from an active decay measurement.

This provides a full knowledge of the capacitance curve as shown in FIG. 9, where Cmax is a maximum capacitance of the drive capacitors. Specifically, FIG. 9 illustrates normalized capacitance curves over the deflection angle measured from the active decay measurement. In addition, FIG. 10 shows a normalized capacitance curve over the deflection angle θ measured from an active decay measurement.

By inverting the summed capacitance curves shown in FIG. 9, the branch is chosen according to the direction (vDiff). The angle is then calculated according to Equation 4.

Figure 11:
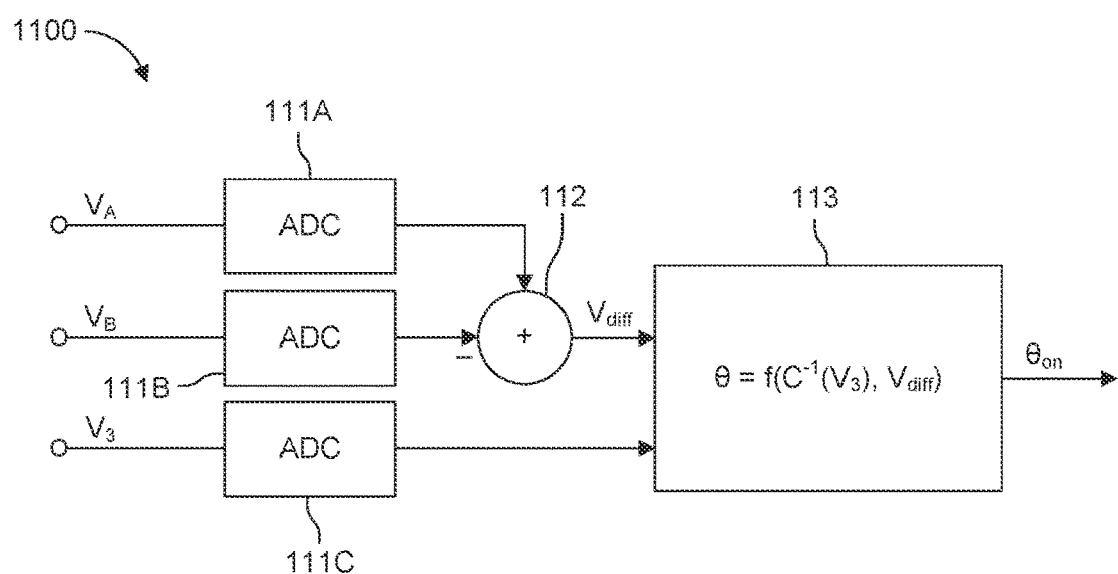
FIG. 11 illustrates schematic block diagram of a measuring circuit according to one or more embodiments.

Embodiments using a capacitance network, such as sensing circuits 700D, 700E, and 700F, will now be discussed in further detail. FIG. 11 illustrates schematic block diagram of a measuring circuit 1100 according to one or more embodiments. In particular, the measuring circuit 1100 is representative of the inverse capacitance calculation unit 53 shown in FIG. 5. The measuring circuit 1100 includes two input nodes that tap (i.e., receive) the voltages vA and Vb from one of the sensing circuits 700D-700F shown in FIG. 7. The voltages vA and vB are provided to a respective analog-to-digital converter (ADC) 111A or 111B that converts their respective analog voltage vA and vB into its digital counterpart.

Additionally, when sensing circuits 700E and 700F are used, the measuring circuit 1100 includes a third input node that taps the voltage v3 from one of the sensing circuits 700E and 700F.

In sensing circuit 700E, voltage v3, at the third node of the capacitor network, corresponds to a full charge of both drive capacitors $C_A$ and $C_B$, which is used to identify the current position (i.e., the deflection angle magnitude) of the mirror 12. Voltage v3 is provided to an ADC 111C that converts the analog voltage v3 into its digital counterpart.

In sensing circuit 700F, voltage v3, at the third node of the capacitor network, corresponds to a full current of both drive capacitors $C_A$ and $C_B$, which is used to identify the current position (i.e., the deflection angle magnitude) of the mirror 12. Voltage v3 is provided to an ADC 111C that converts the analog voltage v3 into its digital counterpart.

The (digital) voltages vA and vB are subtracted (e.g., vDiff=vA−vB) by subtractor 112 to generate a difference voltage vDiff.

It will be further appreciated that the summation and the subtraction of signals can be realized digitally, as described, or in the analog domain via analog circuit components.

The measuring circuit 1100 further includes a processing unit 113 comprising a processor and/or processing circuitry that is programmed with a non-linear function to calculate the deflection angle $\theta_{on}$ and the deflection direction of the mirror 12.

The difference charge, represented by the difference voltage vDiff, provides a voltage sign related to the mirror direction of deflection. Thus, the sign of the difference voltage vDiff can be extracted by the processing unit 113 and multiplied with the deflection angle magnitude to obtain the precise mirror position.

The capacitors 74A and 74B are selected to be much higher (e.g., by about an order of magnitude) than mirror drive capacitances $C_A(\theta)$ and $C_B(\theta)$ in order to prevent losing too much drive voltage. Consequently, the voltages vA and vB are much smaller than the drive voltage amplitude $v_{drive}$. The third series capacitor 75 provides a voltage v3 related to full charge of both mirror capacitors $C_A(\theta)$ and $C_B(\theta)$.

Figure 12:
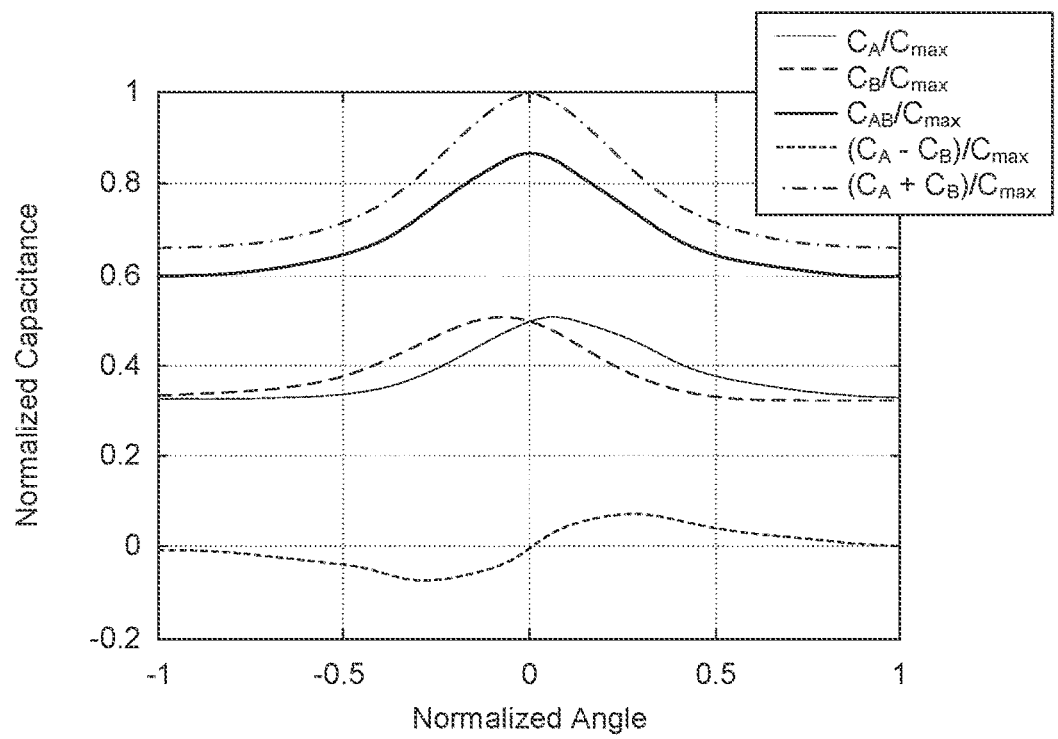
FIG. 12 illustrates normalized capacitance curves over a deflection angle measured from an active decay measurement.

As described above, the capacitance or respective current curves are known for each drive capacitor a prior calibration, where $C_A$ represents the first drive capacitor and $C_B$ represents the second drive capacitor. Thus, Equations 5 and 6 are used to determine the capacitance curve for each drive capacitor, and these capacitance curves are used to determine the full charge capacitance curve $C_{AB}(\theta)$ (i.e., the capacitance function) of the system according to Equation 7:

$$C_{AB}(\theta) = \frac{1}{\frac{1}{c_A(\theta)} + \frac{1}{C_1}} + \frac{1}{\frac{1}{C_B(\theta)} + \frac{1}{C_2}}, \quad \text{Eq. (7)}$$

where C1 is the capacitance of capacitor 74A and C2 is the capacitance of capacitor 74B. This provides a full knowledge of the full charge capacitance curve $C_{AB}(\theta)$ as shown in FIG. 12, where Cmax is a maximum capacitance of the drive capacitors. Specifically, FIG. 12 illustrates normalized capacitance curves over the deflection angle measured from the active decay measurement.

Voltage v3 can also be represented by Equation 8:

$$v_3 = v_{drive} \cdot \frac{1}{1 + \frac{C_3}{C_{AB}(\theta)}}, \quad \text{Eq. (8)}$$

where C3 is the capacitance of capacitor 75. Using the known capacitance function $C_{AB}(\theta)$, the drive voltage $v_{drive}$, and the voltage v3, the processing unit 113 can determine the position of the MEMS mirror 12 that is derived from the measured charge based on Equations 9, 10, and 11:

$$|\theta| = C_{AB}^{-1}\left(\left|C_3 \cdot \frac{v_3}{v_{drive} - v_3}\right|\right), \quad \text{Eq. (9)}$$

where $|\theta|$ is the magnitude of the tile angle, $C_{AB}^{-1}$ is inverse capacitance function (i.e., the inverse of the capacitance function $C_{AB}(\theta)$) of the capacitance network programmed in memory of the processing unit 113, C3 represents the capacitance of capacitor 75, if used, and $v_{drive}$ represents the drive voltage.

The sign of the deflection angle is extracted based on Equation 10:

$$\text{sign}(\theta) = \frac{v_A}{v_{drive} - v_A} - \frac{v_B}{v_{drive} - v_B} \approx v_A - v_B = v_{diff}. \quad \text{Eq. (10)}$$

The combination of Equations 9 and 10, defined by the signals output from the ADC 111C and the subtractor 112, respectively, provides the actual deflection position of the MEMS mirror 12, represented by Equation 11:

$$\theta on = \text{sign}(\theta) \cdot |\theta| \qquad \text{Eq. (11)}.$$

Another method to detect the angle position of the MEMS mirror 12 is matching the displacement current curve, measured with a TIA, to a prior calibration curve of this current. Thus, this method can be used in conjunction with sensing circuits 700A, 700C, and 700F. The capacitance curves can be calibrated as described above, using active decay measurements, and stored in memory of the processing unit 113. The displacement current i, representative of either displacement current iA or iB, is related by Equation 12:

$$i = \frac{dC(\theta)}{d\theta} \cdot \dot{\theta} \cdot v_{drive} + C(\theta) \cdot \dot{v}_{drive}, \qquad \text{Eq. (12)}$$

wherein $C(\theta)$ is either drive capacitance $C_A(\theta)$ or $C_B(\theta)$ and $\theta$ is the deflection angle.

Figure 13:
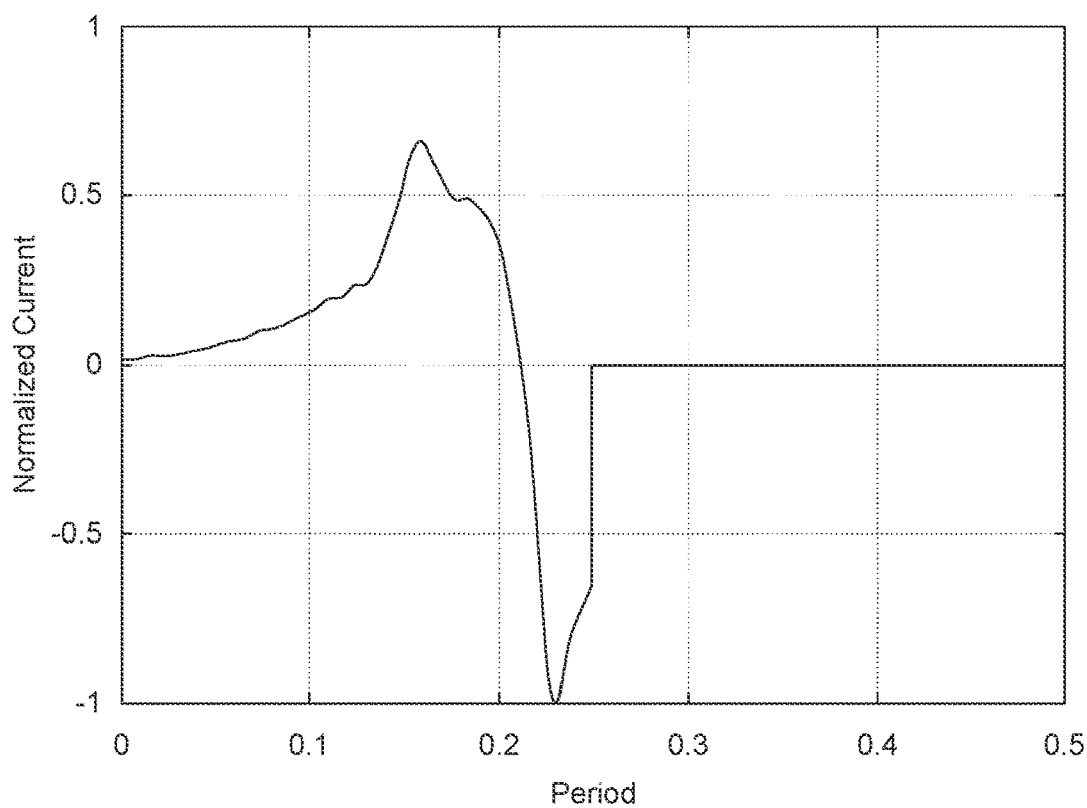
FIG. 13 illustrates an example of a normalized displacement current curve for a half-period at a maximum deflection of a MEMS mirror.

FIG. 13 illustrates an example of a normalized displacement current curve for a half-period (assuming a 50% duty cycle of the drive voltage) at a maximum deflection of the MEMS mirror. It is noted that for every maximum oscillation amplitude the displacement current curve is different. Thus, different displacement current curves can be stored based on maximum oscillation amplitude that is determined during calibration and system testing, and a measured displacement current curve can be matched to one of stored displacement current curves based on maximum oscillation amplitude. By referring to the measured displacement current to the matched (stored) displacement current curve, the deflection angle can be determined.

For example, the normalized displacement current curve in FIG. 13 shows the zero crossing at the end of the voltage-on time in the upper response curve case. Then, the deflection angle and the angular velocity is fitted to the measured displacement current curve using Equation 12. A simpler method is using the current peaks represented by the minimum and maximum of the normalized displacement current curve shown in FIG. 13.

Figure 14:
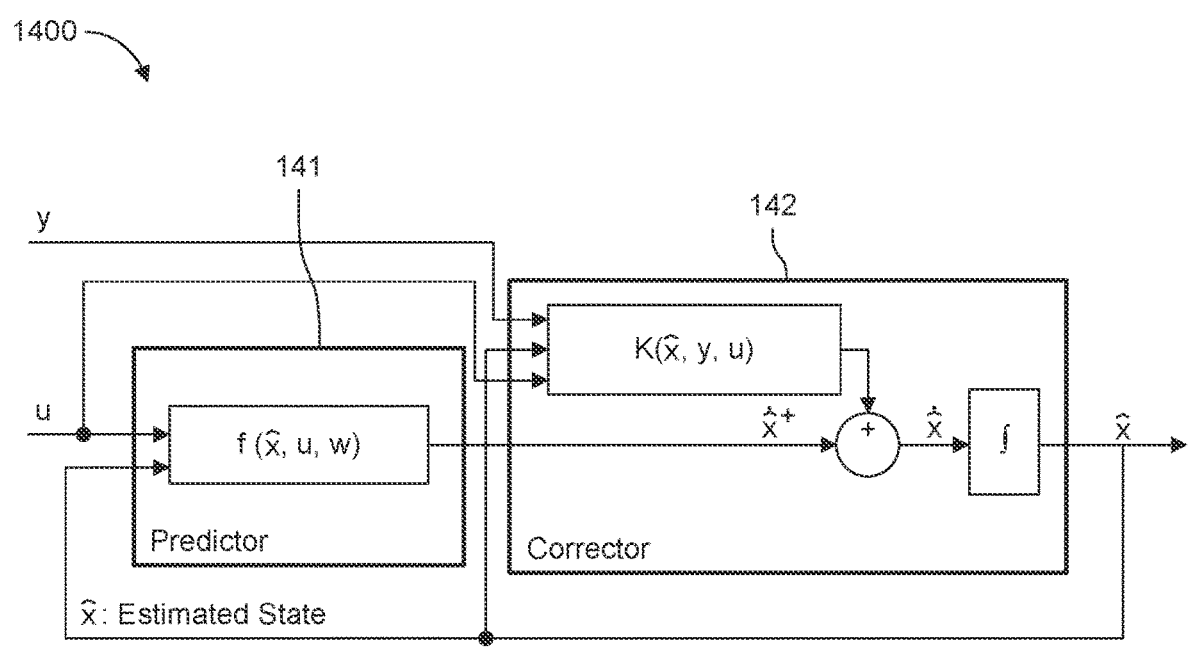
FIG. 14 is a schematic block diagram of a model-based observer according to one or more embodiments.

FIG. 14 is a schematic block diagram of a model-based observer 1400 according to one or more embodiments. The model-based observer 1400 is representative of the observer 55 shown in FIG. 5. The model-based observer 1400 is configured to receive the deflection angle θ determined by the inverse capacitance calculation unit 53 (e.g., output by processing unit 84 or 113) and determine the continuous mirror position, including the actual deflection position and mirror phase, and provide the position information to the system controller 23. The system controller 23 may then use the position information to adjust or compensate the drive voltage $v_{drive}$ used for driving the MEMS mirror 12.

In general, the processing units 84 and 113 are only capable of measuring the deflection during an on-time of the drive voltage. Since the on-time component of the drive voltage alternates with an off-time of the drive voltage, it can be said that the on-time is discontinuous. Thus, it can also be said that measurement signals of the deflection that are output from the processing units 84 and 113 are discontinuous measurement signals received by the model-based observer 1400.

The model-based observer 1400 is configured to estimate a deflection of the MEMS mirror 12 that corresponds to the off-time of the drive voltage. It does this by applying the discontinuous measurement of the deflection made by the inverse capacitance calculation to a non-linear system model of the MEMS mirror 12. In other words, the drive voltage is time-varying driving signal that comprises an on-time component that alternates with an off-time component. The processing units 84 and 113 measure an on-time deflection corresponding to a movement of the MEMS mirror 12 during the on-time component of the driving signal, and provide the measured on-time deflection to the model-based observer 1400. The model-based observer 1400 estimates an off-time deflection angle corresponding to a movement of the MEMS mirror 12 during the off-time component of the drive voltage based on the measured on-time deflection and the non-linear system model, and outputs a continuous measurement of the deflection, including values for both the on-time deflection and the off-time deflection.

Specifically, the model-based observer 1400 applies the measured on-time deflection to the non-linear system model to predict the behavior of the movement of the MEMS mirror 12 during the off-time component of the drive voltage. Based on this prediction, the model-based observer 1400 estimates the off-time deflection. The model-based observer 1400 may provide the deflection magnitude and direction as well as mirror phase as position information to the system controller 23.

As such, the model-based observer 1400 receives a discontinuous measurement signal of the deflection and generates a continuous measurement signal of the deflection. The system controller 23 may receive the continuous measurement signal, which includes a continuous measurement of the deflection—including on-time deflection and off-time deflection—and may regulate the driving signal generated by the driver 25 based on the measured on-time deflection and the estimated off-time deflection provided by the continuous measurement signal.

The model-based observer 1400 includes a predictor 141 and corrector 142, both of which are implemented in one or more processors that perform programed calculations.

A model-based observer 1400 is applied to estimate the actual mirror motion $\hat{x}=(\hat{\theta}, \dot{\hat{\theta}})$, or deflection amplitude and phase respectively. The model-based observer 1400 is defined by Equation 13:

$$\dot{\hat{x}} = f(\hat{x}, u) + k(\hat{x}, y) \qquad \text{Eq. (13)},$$

where $\hat{x}$ is the estimated mirror state, u is the (known) drive voltage $v_{drive}$, and y is the output of the system. Specifically, y is the measured on-time deflection θon received from the inverse capacitance calculation unit 53. Depending on the implementation of the controller 23, y and $\hat{x}$ (or only e=y−h($\hat{x}$)) are output to the controller 23. The prediction is done in the model f($\hat{x}$, u), that contains the full mirror behavior and k($\hat{x}$, y) is the corrector that may reduce the estimation error (e=y−h($\hat{x}$)), where $\hat{y}$=h($\hat{x}$) is the output function of the prediction.

Any appropriate model containing the non-linear MEMS mirror behavior is advantageous to use here. The model-based observer 1400 provides a continuous feedback while the MEMS mirror 12 is oscillating since the drive voltage is switched off for rectangular drive voltage. This can be used for a continuous feedback control of the MEMS mirror 12.

In view of the above, an electrostatic MEMS mirror with charge self-sensing using current integrator and position observer is provided. The mirror has two capacitive elements each with an asymmetric characteristic according to the deflection direction (e.g., the tilt direction). The displacement currents are integrated resulting in determining the capacitive charge for each of the two capacitive elements. The sum capacitive charges is used to calculate the current mirror deflection magnitude using a capacitance deflection characteristic of the MEMS mirror (i.e., using the inverse capacitance function). The difference of the capacitive charges is used to detect the direction of the mirror deflection. The summed and difference charge measurements are fed into a processing circuit that estimates the mirror deflection angle (e.g., the tilt angle). A controller uses the observed or measured mirror deflection to regulate the mirror phase and/or amplitude of the MEMS mirror by regulating and/or compensating the drive voltage that controls the actuator that drives the MEMS mirror.

Additionally, an electrostatic MEMS mirror with charge self-sensing using a series capacitive network and a position observer is provided. The mirror has two capacitive elements with an asymmetric characteristic according to the deflection direction. The difference of individual series capacitors each connected to one of the two capacitive elements is used to detect a direction of the mirror deflection (i.e., the tilt direction). Another series capacitor connected to the output of both the first two series capacitors is used to calculate the current mirror deflection magnitude. The series capacitances are large enough with respect to the drive electrodes as to not lose relevant drive voltage. The charge measurements are fed into a processing circuit, that runs in parallel and estimates the mirror deflection angle. A controller uses the observed or measured mirror deflection angle to regulate the mirror phase and/or amplitude by regulating and/or compensating the drive voltage that controls the actuator that drives the MEMS mirror.

Some or all capacitances of the series capacitive network can be replaced by switched current integrators for measuring the charge. As a result, less drive voltage is lost in this case.

Additionally, an electrostatic MEMS mirror, that matches the displacement current curve to a calibration curve to determine the deflection angle, is provided. This embodiment also uses a position observer. The mirror has two capacitive elements with an asymmetric characteristic according to the deflection direction (i.e., the tilt direction). The displacement currents are measured resulting in two displacement current curves during voltage-on time. The displacement current curves are matched to stored calibration data to obtain the actual mirror position during voltage-on time. The measurement is fed into a processing circuit, that runs in parallel and estimates the mirror deflection angle. A controller uses the observed or measured mirror deflection angle to regulate the mirror phase and/or amplitude by regulating and/or compensating the drive voltage that controls the actuator that drives the MEMS mirror.

Although embodiments described herein relate to a MEMS device with a mirror, it is to be understood that other implementations may include optical devices other than MEMS mirror devices, including other non-linear oscillating structures, including those not related to LIDAR. In addition, although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the method steps may be executed by such an apparatus.

While various embodiments have been described, it will be apparent to those of ordinary skill in the art that many more embodiments and implementations are possible within the scope of the disclosure. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor" or "processing circuitry" as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

Thus, the techniques described in this disclosure may be implemented, at least in part, in hardware, software, firmware, or any combination thereof. For example, various aspects of the described techniques may be implemented within one or more processors, including one or more microprocessors, DSPs, ASICs, or any other equivalent integrated or discrete logic circuitry, as well as any combinations of such components.

A controller including hardware may also perform one or more of the techniques described in this disclosure. Such hardware, software, and firmware may be implemented within the same device or within separate devices to support the various techniques described in this disclosure. Software may be stored on a non-transitory computer-readable medium such that the non-transitory computer readable medium includes a program code or a program algorithm stored thereon which, when executed, causes the controller, via a computer program, to perform the steps of a method.

Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. An oscillator system, comprising:
an electrostatic oscillator structure configured to oscillate about an axis based on a deflection of the electrostatic oscillator structure that varies over time;
an actuator configured to drive the electrostatic oscillator structure about the axis based on a driving signal, the actuator comprising a first capacitive element having a first capacitance dependent on the deflection and a second capacitive element having a second capacitance dependent on the deflection;
a driver configured to generate the driving signal;
a sensing circuit configured to receive a first displacement current from the first capacitive element and a second displacement current from the second capacitive element, to integrate the first displacement current to generate a first capacitive charge value, and to integrate the second displacement current to generate a second capacitive charge value; and
a measurement circuit configured to receive the first capacitive charge value and the second capacitive charge value and to measure a characteristic of the deflection of the electrostatic oscillator structure based on the first capacitive charge value and the second capacitive charge value.

2. The oscillator system of claim 1, further comprising:
a controller configured to regulate the driving signal generated by the driver based on the characteristic of the deflection measured by the measurement circuit.

3. The oscillator system of claim 1, wherein:
the first capacitive charge value is expressed by a first voltage value, and
the second capacitive charge value is expressed by a second voltage value.

4. The oscillator system of claim 1, wherein:
the measurement circuit is configured to generate a summed charge value based on a summation of the first capacitive charge value and the second capacitive charge value and determine a magnitude of the deflection based on the summed charge value.

5. The oscillator system of claim 4, wherein:
the measurement circuit is configured to generate a difference charge value based on a difference between the first capacitive charge value and the second capacitive charge value and determine a deflection direction of the deflection based on the difference charge value.

6. The oscillator system of claim 5, wherein:
the measurement circuit is configured to determine a deflection angle of the deflection based on the summed charge value and the difference charge value.

7. The oscillator system of claim 1, wherein:
the measurement circuit is configured to generate a difference charge value based on a difference between the first capacitive charge value and the second capacitive charge value and determine a deflection direction of the deflection based on the difference charge value.

8. The oscillator system of claim 4, wherein:
the measurement circuit is configured to determine the magnitude of the deflection by comparing the summed charge value with a predetermined capacitance deflection characteristic of the actuator.

9. The oscillator system of claim 8, wherein:
the predetermined capacitance deflection characteristic is an inverse capacitive function of the first capacitive element and the second capacitive element.

10. The oscillator system of claim 1, wherein:
the first capacitive element and the second capacitive element both have an asymmetric characteristic according to a deflection direction of the electrostatic oscillator structure.

11. The oscillator system of claim 1, wherein:
the driving signal is time-varying comprising an on-time component that alternates with an off-time component,
the characteristic of the deflection is a measured on-time deflection corresponding to a movement of the electrostatic oscillating structure during the on-time component of the driving signal, and
the measurement circuit is further configured to estimate an off-time deflection corresponding to a movement of the electrostatic oscillating structure during the off-time component of the driving signal based on the measured on-time deflection.

12. The oscillator system of claim 11, further comprising:
a controller configured to regulate the driving signal generated by the driver based on the measured on-time deflection and the off-time deflection estimated by the measurement circuit.

13. An oscillator system, comprising:
an electrostatic oscillator structure configured to oscillate about an axis based on a deflection of the electrostatic oscillator structure that varies over time;
an actuator configured to drive the electrostatic oscillator structure about the axis based on a driving signal, the actuator comprising a first capacitive element having a first capacitance dependent on the deflection and a second capacitive element having a second capacitance dependent on the deflection;
a driver configured to generate the driving signal;
a sensing circuit comprising a first capacitor coupled to the first capacitive element, a second capacitor coupled to the second capacitive element, and a third capacitor coupled to an output of the first capacitor and to an output of the second capacitor, wherein the third capacitor is configured to generate a capacitive charge value; and a measurement circuit configured to receive the capacitive charge value and determine a magnitude of the deflection of the electrostatic oscillator structure based on the capacitive charge value.

14. The oscillator system of claim 13, further comprising:
a controller configured to regulate the driving signal generated by the driver based on the magnitude of the deflection determined by the measurement circuit.

15. The oscillator system of claim 13, wherein:
the measurement circuit is configured to determine the magnitude of the deflection by comparing the capacitive charge value with a predetermined capacitance deflection characteristic of the actuator.

16. The oscillator system of claim 15, wherein:
the predetermined capacitance deflection characteristic is an inverse capacitive function of a capacitive network including the first capacitive element, the second capacitive element, the first capacitor, and the second capacitor.

17. An oscillator system, comprising:
an electrostatic oscillator structure configured to oscillate about an axis based on a deflection that varies over time;
an actuator configured to drive the electrostatic oscillator structure about the axis based on a time-varying driving signal, the actuator comprising a capacitive element having a capacitance dependent on the deflection;
a driver configured to generate the time-varying driving signal comprising an on-time component that alternates with an off-time component;
a sensing circuit configured to receive a displacement current from the capacitive element and to measure the displacement current during the on-time component of the time-varying driving signal; and
a measurement circuit configured to generate a displacement current curve from the measured displacement current, to match the displacement current curve to stored calibration data and to determine an on-time deflection corresponding to a movement of the electrostatic oscillating structure during the on-time component of the time-varying driving signal based on the stored calibration data matched with the displacement current curve.

18. The oscillator system of claim 17, further comprising:
a controller configured to regulate the time-varying driving signal generated by the driver based on the on-time deflection.

19. The oscillator system of claim 17, wherein:
the measurement circuit is configured to estimate an off-time deflection corresponding to a movement of the electrostatic oscillating structure during the off-time component of the time-varying driving signal based on the on-time deflection.

20. The oscillator system of claim 19, further comprising:
a controller configured to regulate the time-varying driving signal generated by the driver based on the on-time deflection and the off-time deflection estimated by the measurement circuit.

* * * * *